United States Patent
Yamazaki et al.

(10) Patent No.: US 12,420,469 B2
(45) Date of Patent: Sep. 23, 2025

(54) METHOD FOR MANUFACTURING CYLINDRICAL HONEYCOMB FIRED BODY

(71) Applicant: NGK Insulators, Ltd., Nagoya (JP)

(72) Inventors: Yasunori Yamazaki, Nagoya (JP); Kazuya Kageyama, Nagoya (JP); Yusuke Hayakawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 412 days.

(21) Appl. No.: 18/167,241

(22) Filed: Feb. 10, 2023

(65) Prior Publication Data

US 2023/0311398 A1 Oct. 5, 2023

(30) Foreign Application Priority Data

Mar. 31, 2022 (JP) ................... 2022-060620

(51) Int. Cl.
*B29C 48/11* (2019.01)
*B29C 48/92* (2019.01)
(Continued)

(52) U.S. Cl.
CPC ............ *B29C 48/11* (2019.02); *B29C 48/92* (2019.02); *B29D 99/0089* (2013.01); *B29C 2948/92666* (2019.02); *B29L 2031/608* (2013.01)

(58) Field of Classification Search
CPC ..... B29C 48/11; B29C 48/09; B29D 99/0089; B28B 3/269; B28B 11/243; B28B 11/007; B29L 2031/608; C04B 38/0006
See application file for complete search history.

(56) References Cited

U.S. PATENT DOCUMENTS

| | | | | |
|---|---|---|---|---|
| 7,591,918 B2* | 9/2009 | Suwabe | ............ | B01D 46/2486 428/116 |
| 7,727,613 B2* | 6/2010 | Suwabe | ................. | C04B 41/85 428/116 |

(Continued)

FOREIGN PATENT DOCUMENTS

| | | |
|---|---|---|
| JP | H07-026044 A | 1/1995 |
| JP | 2002-267427 A | 9/2002 |
| JP | 6376701 B2 | 8/2018 |

*Primary Examiner* — Seyed Masoud Malekzadeh
(74) *Attorney, Agent, or Firm* — BURR PATENT LAW, PLLC

(57) ABSTRACT

A method for manufacturing a cylindrical honeycomb fired body including: preparing a cylindrical honeycomb formed body; obtaining a cylindrical honeycomb dried body by drying the cylindrical honeycomb formed body; calculating predetermined parameters ($E_{AVE1}$, $E_{AVE2}$, $E_{AVE3}$ and $E_{AVE4}$) from average values of distance between a center of gravity position O and an outer peripheral contour in a plurality of predetermined angle ranges; specifying a minimum value of the predetermined parameters; obtaining a cylindrical honeycomb fired body by placing the cylindrical honeycomb dried body on a shelf plate and firing it while passing it through a continuous firing furnace, such that the direction in which the cells of the cylindrical honeycomb dried body extend vertically, and a particular location on the outer peripheral side surface determined according to the minimum value is positioned at the front.

18 Claims, 8 Drawing Sheets

(51) Int. Cl.
  *B29D 99/00*  (2010.01)
  *B29L 31/60*  (2006.01)

(56) References Cited

U.S. PATENT DOCUMENTS

| | | | | |
|---|---|---|---|---|
| 8,481,454 B2 * | 7/2013 | Ohno | ............... | C04B 35/6262 |
| | | | | 264/630 |
| 8,518,855 B2 * | 8/2013 | Ohno | ............... | C04B 38/0009 |
| | | | | 264/630 |
| 8,591,623 B2 * | 11/2013 | Beall | ............... | C04B 38/0009 |
| | | | | 422/170 |
| 9,023,454 B2 * | 5/2015 | Kikuchi | ............... | B01J 35/57 |
| | | | | 428/116 |
| 9,091,482 B2 * | 7/2015 | Schumann | ............... | F27D 5/00 |
| 9,862,649 B2 * | 1/2018 | Watanabe | ............... | F27D 5/00 |
| 10,022,891 B2 * | 7/2018 | Kitaguchi | ............... | B28B 11/248 |
| 10,035,283 B2 * | 7/2018 | Kitaguchi | ............... | B28B 11/12 |
| 10,039,301 B1 * | 8/2018 | Lanter | ............... | B29C 48/05 |
| 10,046,430 B2 * | 8/2018 | Fukui | ............... | B24B 55/06 |
| 10,472,289 B2 * | 11/2019 | Wing | ............... | C04B 35/638 |
| 10,769,772 B2 * | 9/2020 | Madara | ............... | G06T 7/11 |
| 11,969,721 B2 * | 4/2024 | Tokuda | ............... | B01J 37/0009 |
| 2006/0105139 A1 * | 5/2006 | Suwabe | ............... | C04B 41/5089 |
| | | | | 428/116 |
| 2006/0192324 A1 * | 8/2006 | Kaneda | ............... | C04B 35/62635 |
| | | | | 264/630 |
| 2007/0158879 A1 * | 7/2007 | Suwabe | ............... | B01D 46/2451 |
| | | | | 264/630 |
| 2008/0236724 A1 * | 10/2008 | Higuchi | ............... | C04B 38/0016 |
| | | | | 156/89.22 |
| 2010/0216634 A1 * | 8/2010 | Ohno | ............... | C04B 35/638 |
| | | | | 264/630 |
| 2010/0222213 A1 * | 9/2010 | Ohno | ............... | B01D 46/2429 |
| | | | | 264/43 |
| 2010/0247406 A1 * | 9/2010 | Ohno | ............... | C04B 35/478 |
| | | | | 428/116 |
| 2010/0248951 A1 * | 9/2010 | Ohno | ............... | C10K 1/024 |
| | | | | 428/116 |
| 2011/0236625 A1 * | 9/2011 | Kikuchi | ............... | C04B 35/6303 |
| | | | | 428/116 |
| 2012/0031061 A1 * | 2/2012 | Beall | ............... | C04B 38/0009 |
| | | | | 501/83 |
| 2013/0300016 A1 * | 11/2013 | Brew | ............... | B28B 3/2681 |
| | | | | 264/40.5 |
| 2016/0207158 A1 * | 7/2016 | Fukui | ............... | B24B 7/16 |
| 2016/0243723 A1 * | 8/2016 | Kitaguchi | ............... | C04B 33/32 |
| 2016/0243724 A1 * | 8/2016 | Kitaguchi | ............... | C04B 33/32 |
| 2018/0148382 A1 * | 5/2018 | Wing | ............... | B01J 35/57 |
| 2018/0215672 A1 * | 8/2018 | Kitaguchi | ............... | C04B 41/009 |
| 2018/0310594 A1 * | 11/2018 | Lanter | ............... | A23K 40/25 |
| 2019/0159480 A1 * | 5/2019 | Lanter | ............... | A23K 40/25 |
| 2022/0258149 A1 * | 8/2022 | Tokuda | ............... | B01J 37/08 |
| 2022/0324136 A1 * | 10/2022 | Citriniti | ............... | B29C 48/11 |

* cited by examiner

METHOD FOR MANUFACTURING CYLINDRICAL HONEYCOMB FIRED BODY

CROSS REFERENCE TO RELATED APPLICATIONS

The present invention claims the benefit of priority to Japanese Patent Application No. 2022-060620 filed on Mar. 31, 2022 with the Japanese Patent Office, the entire contents of which are incorporated herein by reference in its entirety.

FIELD OF THE INVENTION

The present invention relates to a method for manufacturing a cylindrical honeycomb fired body.

BACKGROUND OF THE INVENTION

Pillar-shaped honeycomb fired bodies are widely used for catalyst carriers, various filters, and the like. In recent years, particular attention has been focused on their use as diesel particulate filters (DPFs) and gasoline particulate filters (GPFs) for trapping particulate matter emitted from diesel engines.

A pillar-shaped honeycomb fired body can be manufactured by kneading a raw material composition obtained by appropriately adding various additives to a ceramic raw material, a pore-forming material, a binder and water to form a green body, and then by extrusion molding through a die defining a predetermined cell structure to prepare a pillar-shaped honeycomb formed body, and cutting it to a predetermined length, then drying and firing it. An annular member called a mask or a holding plate is attached adjacently downstream of the die used for extrusion molding, and it defines the contour of the outer peripheral side surface of the pillar-shaped honeycomb formed body (for example, Japanese Patent No. 6376701).

Measuring the external dimensions of a pillar-shaped honeycomb structure such as a pillar-shaped honeycomb formed body and a pillar-shaped honeycomb fired body is an important matter in terms of quality control, and several measuring methods are conventionally known. For example, Japanese Patent Application Publication No. H07-26044 discloses a method for measuring a three-dimensional outer shape of an object to be measured, in which an arm equipped with a plurality of laser displacement gauges at different heights is rotated around the object to be measured placed on a plane perpendicular to an axis of rotation of the arm. Japanese Patent Application Publication No. 2002-267427 discloses a method for measuring an outer shape of a honeycomb structure, characterized in obtaining an original image by imaging an end surface of a honeycomb structure; obtaining an average brightness of an outer wall portion of the honeycomb structure in the obtained original image; obtaining a filled image in which an inside of the honeycomb structure is filled with the obtained average brightness on the original image; and measuring the outer shape by performing edge detection processing on the obtained filled image.

PRIOR ART

Patent Literature

[Patent Literature 1] Japanese Patent No. 6376701
[Patent Literature 2] Japanese Patent Application Publication No. H07-26044
[Patent Literature 3] Japanese Patent Application Publication No. 2002-267427

SUMMARY OF THE INVENTION

Shrinkage occurs in the firing process of a honeycomb formed body. For this reason, the designed dimensions of the honeycomb formed body are determined in consideration of shrinkage so that the honeycomb fired body falls within the dimensional tolerance. It is considered that the shrinkage ratio at the time of shrinkage can be determined by measuring the outer diameter before and after firing. However, there is a problem that the ratio is not uniform and differs depending on the portions of the honeycomb formed body. Therefore, with the conventional external dimension measurement technology, although the external dimensions of the honeycomb formed body and the honeycomb fired body can be determined, sufficient progress has not been made in examining how to utilize the measurement results of the external dimensions in favor of the firing conditions of the honeycomb fired body and the manufacturing conditions of the honeycomb formed body. It would be advantageous if the yield in manufacturing the honeycomb fired bodies could be increased by effectively utilizing the measurement results of the external dimensions.

The present invention has been made in view of the above circumstances, and the target is focused on cylindrical honeycomb fired bodies, which are in great demand among pillar-shaped honeycomb fired bodies. An object of the present invention is thus to provide a method for manufacturing a cylindrical honeycomb fired body that contributes to an improvement in yield.

In order to achieve the above object, the present inventors have investigated the reasons why the shrinkage ratio during shrinkage differs depending on the portions of a cylindrical honeycomb formed body. As a result, the inventors have found that the heat history that the cylindrical honeycomb formed body receives in a firing furnace differs depending on the portions of the cylindrical honeycomb formed body, due to the position of the burner and the influence of the gas flow in the furnace. For this reason, for example, if the shrinkage ratio is calculated on the premise that the cylindrical honeycomb formed body shrinks uniformly, and the dimensions of the cylindrical honeycomb formed body are determined based on such shrinkage ratio, the shrinkage is not actually uniform, so the dimensional accuracy of portions that deviate from the shrinkage ratio becomes poor.

In addition, the present inventors have found that, even if the shrinkage ratio at the time of shrinkage differs depending on the portions, it is not random, and when the cylindrical honeycomb formed body is fired while passing it through a continuous firing furnace, certain portions of the outer peripheral side surface shrinks greatly. The present invention has been accomplished based on this finding, and is exemplified as below.

[1] A method for manufacturing a cylindrical honeycomb fired body, the cylindrical honeycomb fired body comprising an outer peripheral side surface, and partition walls disposed on an inner peripheral side of the outer peripheral side surface and partitioning a plurality of cells forming flow paths from a first end surface to a second end surface, the method comprising:
   a step A of preparing a cylindrical honeycomb formed body by extrusion molding a green body comprising a ceramic raw material, a pore-forming material, a binder and a dispersion medium through a die defining an opening shape of the plurality of cells and an annular mask located downstream of the die and having an inner peripheral contour for defining an outer peripheral contour of the first end surface and the second end surface, such that a direction in which the cells extend is horizontal and a front side in a traveling direction of the extrusion molding is the first end surface, and a rear side is the second end surface, and then by cutting to a predetermined length;

a step B of obtaining a cylindrical honeycomb dried body by drying the cylindrical honeycomb formed body;

a step C of calculating:

$$(D_{1AVE}+D_{4AVE}+D_{6AVE})-(D_{2AVE}+D_{5AVE}+D_{8AVE})=E_{AVE1},$$

$$(D_{3AVE}+D_{6AVE}+D_{8AVE})-(D_{2AVE}+D_{4AVE}+D_{7AVE})=E_{AVE2},$$

$$(D_{2AVE}+D_{5AVE}+D_{8AVE})-(D_{1AVE}+D_{4AVE}+D_{6AVE})=E_{AVE3}, \text{ and}$$

$$(D_{2AVE}+D_{4AVE}+D_{7AVE})-(D_{3AVE}+D_{6AVE}+D_{8AVE})=E_{AVE4},$$

in which, assuming that a cross-section perpendicular to the direction in which the cells of the cylindrical honeycomb dried body extend is observed from the front side in the traveling direction of the extrusion molding of the step A, and a location on the outer peripheral side surface located at a vertex during the extrusion molding in the step A is 0 rad, with a clockwise direction as a + direction, $D_{1AVE}$ is defined as an average value of distance between a center of gravity position O and an outer peripheral contour of the cross-section in a central angle (rad) from $-\frac{1}{8}\pi$ to $+\frac{1}{8}\pi$, $D_{2AVE}$ is defined as an average value of distance between the center of gravity position O and the outer peripheral contour of the cross-section in a central angle (rad) from $+\frac{1}{8}\pi$ to $+\frac{3}{8}\pi$, $D_{3AVE}$ is defined as an average value of distance between the center of gravity position O and the outer peripheral contour of the cross-section in a central angle (rad) from $+\frac{3}{8}\pi$ to $+\frac{5}{8}\pi$, $D_{4AVE}$ is defined as an average value of distance between the center of gravity position O and the outer peripheral contour of the cross-section in a central angle (rad) from $+\frac{5}{8}\pi$ to $+\frac{7}{8}\pi$, $D_{5AVE}$ is defined as an average value of distance between the center of gravity position O and the outer peripheral contour of the cross-section in a central angle (rad) from $+\frac{7}{8}\pi$ to $+9/8\pi$, $D_{6AVE}$ is defined as an average value of distance between the center of gravity position O and the outer peripheral contour of the cross-section in a central angle (rad) from $+9/8\pi$ to $+11/8\pi$, $D_{7AVE}$ is defined as an average value of distance between the center of gravity position O and the outer peripheral contour of the cross-section in a central angle (rad) from $+11/8\pi$ to $+13/8\pi$, and $D_{8AVE}$ is defined as an average value of distance between the center of gravity position O and the outer peripheral contour of the cross-section in a central angle (rad) from $+13/8\pi$ to $+15/8\pi$;

a step D of specifying a minimum value among $E_{AVE1}$, $E_{AVE2}$, $E_{AVE3}$, and $E_{AVE4}$ calculated in the step C;

a step E of obtaining a cylindrical honeycomb fired body by placing the cylindrical honeycomb dried body on a shelf plate and firing it while passing it through a continuous firing furnace, such that the direction in which the cells of the cylindrical honeycomb dried body extend is parallel to a vertical direction and:

when the minimum value is $E_{AVE1}$, a location on the outer peripheral side surface corresponding to 0 rad is positioned at the front, when the minimum value is $E_{AVE2}$, a location on the outer peripheral side surface corresponding to $\frac{4}{8}\pi$ rad is positioned at the front, when the minimum value is $E_{AVE3}$, a location on the outer peripheral side surface corresponding to $8/8\pi$ rad is positioned at the front, and when the minimum value is $E_{AVE4}$, a location on the outer peripheral side surface corresponding to $12/8\pi$ rad is positioned at the front.

[2] The method for manufacturing a cylindrical honeycomb fired body according to [1], wherein the step B comprises placing the honeycomb formed body in a dryer such that the direction in which the cells extend is the vertical direction, and drying it while passing it through the dryer such that the location on the outer peripheral side surface located at the vertex during the extrusion molding in the step A is positioned at the front.

[3] The method for manufacturing a cylindrical honeycomb fired body according to [1] or [2], comprising determining whether or not the minimum value specified in the step D satisfies a predetermined criterion, and performing the step E only when the minimum value satisfies the predetermined criterion.

[4] The method for manufacturing a cylindrical honeycomb fired body according to [3], comprising determining whether or not the minimum value specified in the step D satisfies the predetermined criterion, and when the minimum value does not satisfy the predetermined criterion, performing a step F instead of the step E, the step F comprising preparing an annular mask with a modified inner peripheral contour according to the minimum value, such that a minimum value among $E_{AVE1}$, $E_{AVE2}$, $E_{AVE3}$, and $E_{AVE4}$ of a next cylindrical honeycomb dried body to be prepared can satisfy the criterion; and the method further comprising thereafter repeating the steps A to D again provided that the modified annular mask is used.

[5] The method for manufacturing a cylindrical honeycomb fired body according to [3] or [4], wherein the predetermined criterion is that the minimum value is in the range of $-0.3$ mm to $-0.1$ mm.

[6] The method for manufacturing a cylindrical honeycomb fired body according to any one of [1] to [5], wherein for calculating $E_{AVE1}$, $E_{AVE2}$, $E_{AVE3}$, and $E_{AVE4}$, the step C comprises in sequence:

placing the cylindrical honeycomb dried body on a rotary stage with the first end surface or the second end surface facing upward; and continuously measuring distance using a displacement gauge between an arbitrary point on the outer peripheral side surface of the cylindrical honeycomb dried body and the displacement gauge while rotating the rotary stage for one revolution.

[7] A method for manufacturing a cylindrical honeycomb fired body, the cylindrical honeycomb fired body comprising an outer peripheral side surface, and partition walls disposed on an inner peripheral side of the outer peripheral side surface and partitioning a plurality of cells forming flow paths from a first end surface to a second end surface, the method comprising:

a step A of preparing a cylindrical honeycomb formed body by extrusion molding a green body comprising a ceramic raw material, a pore-forming material, a binder and a dispersion medium through a die defining an opening shape of the plurality of cells and an annular mask located downstream of the die and having an inner peripheral contour for defining an outer peripheral contour of the first end surface and the second end surface, such that a direction in which the cells extend is horizontal and a front side in a traveling direction of the extrusion molding is the first end surface, and a rear side is the second end surface, and then by cutting to a predetermined length;

a step B of obtaining a cylindrical honeycomb dried body by drying the cylindrical honeycomb formed body;

a step C of calculating:

$$(D_{1MAX}+D_{4MAX}+D_{6MAX})-(D_{2MAX}+D_{5MAX}+D_{8MAX})= E_{MAX1},$$

$$(D_{3MAX}+D_{6MAX}+D_{8MAX})-(D_{2MAX}+D_{4MAX}+D_{7MAX})= E_{MAX2},$$

$$(D_{2MAX}+D_{5MAX}+D_{8MAX})-(D_{1MAX}+D_{4MAX}+D_{6MAX})= E_{MAX3}, \text{ and}$$

$$(D_{2MAX}+D_{4MAX}+D_{7MAX})-(D_{3MAX}+D_{6MAX}+D_{8MAX})= E_{MAX4},$$

in which, assuming that a cross-section perpendicular to the direction in which the cells of the cylindrical honeycomb dried body extend is observed from the front side in the traveling direction of the extrusion molding of the step A, and a location on the outer peripheral side surface located at a vertex during the extrusion molding in the step A is 0 rad, with a clockwise direction as a + direction, $D_{1MAX}$ is defined as a maximum value of distance between a center of gravity position O and an outer peripheral contour of the cross-section in a central angle (rad) from $-\frac{1}{8}\pi$ to $+\frac{1}{8}\pi$, $D_{2MAX}$ is defined as a maximum value of distance between the center of gravity position O and the outer peripheral contour of the cross-section in a central angle (rad) from $+\frac{1}{8}\pi$ to $+\frac{3}{8}\pi$, $D_{3MAX}$ is defined as a maximum value of distance between the center of gravity position O and the outer peripheral contour of the cross-section in a central angle (rad) from $+\frac{3}{8}\pi$ to $+\frac{5}{8}\pi$, $D_{4MAX}$ is defined as a maximum value of distance between the center of gravity position O and the outer peripheral contour of the cross-section in a central angle (rad) from $+\frac{5}{8}\pi$ to $+\frac{7}{8}\pi$, $D_{5MAX}$ is defined as a maximum value of distance between the center of gravity position O and the outer peripheral contour of the cross-section in a central angle (rad) from $+\frac{7}{8}\pi$ to $+\frac{9}{8}\pi$, $D_{6MAX}$ is defined as a maximum value of distance between the center of gravity position O and the outer peripheral contour of the cross-section in a central angle (rad) from $+9/8\pi$ to $+11/8\pi$, $D_{7MAX}$ is defined as a maximum value of distance between the center of gravity position O and the outer peripheral contour of the cross-section in a central angle (rad) from $+11/8\pi$ to $+13/8\pi$, and $D_{8MAX}$ is defined as a maximum value of distance between the center of gravity position O and the outer peripheral contour of the cross-section in a central angle (rad) from $+13/8\pi$ to $+15/8\pi$;

a step D of specifying a minimum value among $E_{MAX1}$, $E_{MAX2}$, $E_{MAX3}$, and $E_{MAX4}$ calculated in the step C;

a step E of obtaining a cylindrical honeycomb fired body by placing the cylindrical honeycomb dried body on a shelf plate and firing it while passing it through a continuous firing furnace, such that the direction in which the cells of the cylindrical honeycomb dried body extend is parallel to a vertical direction and:

when the minimum value is $E_{MAX1}$, a location on the outer peripheral side surface corresponding to 0 rad is positioned at the front, when the minimum value is $E_{MAX2}$, a location on the outer peripheral side surface corresponding to 4/8 π rad is positioned at the front, when the minimum value is $E_{MAX3}$, a location on the outer peripheral side surface corresponding to 8/8 π rad is positioned at the front, and when the minimum value is $E_{MAX4}$, a location on the outer peripheral side surface corresponding to 12/8 π rad is positioned at the front.

[8] The method for manufacturing a cylindrical honeycomb fired body according to [7], wherein the step B comprises placing the honeycomb formed body in a dryer such that the direction in which the cells extend is the vertical direction, and drying it while passing it through the dryer such that the location on the outer peripheral side surface located at the vertex during the extrusion molding in the step A is positioned at the front.

[9] The method for manufacturing a cylindrical honeycomb fired body according to [7] or [8], comprising determining whether or not the minimum value specified in the step D satisfies a predetermined criterion, and performing the step E only when the minimum value satisfies the predetermined criterion.

[10] The method for manufacturing a cylindrical honeycomb fired body according to [9], comprising determining whether or not the minimum value specified in the step D satisfies the predetermined criterion, and when the minimum value does not satisfy the predetermined criterion, performing a step F instead of the step E, the step F comprising preparing an annular mask with a modified inner peripheral contour according to the minimum value, such that a minimum value among $E_{MAX1}$, $E_{MAX2}$, $E_{MAX3}$, and $E_{MAX4}$ of a next cylindrical honeycomb dried body to be prepared can satisfy the criterion; and the method further comprising thereafter repeating the steps A to D again provided that the modified annular mask is used.

[11] The method for manufacturing a cylindrical honeycomb fired body according to [9] or [10], wherein the predetermined criterion is that the minimum value is in the range of −0.3 mm to −0.1 mm.

[12] The method for manufacturing a cylindrical honeycomb fired body according to any one of [7] to [11], wherein for calculating $E_{MAX1}$, $E_{MAX2}$, $E_{MAX3}$, and $E_{MAX4}$, the step C comprises performing in sequence:

placing the cylindrical honeycomb dried body on a rotary stage with the first end surface or the second end surface facing upward; and continuously measuring distance using a displacement gauge between an arbitrary point on the outer peripheral side surface of the cylindrical honeycomb dried body and the displacement gauge while rotating the rotary stage for one revolution.

[13] A method for manufacturing a cylindrical honeycomb fired body, the cylindrical honeycomb fired body comprising an outer peripheral side surface, and partition walls disposed on an inner peripheral side of the outer peripheral side surface and partitioning a plurality of cells forming flow paths from a first end surface to a second end surface, the method comprising:

a step A of preparing a cylindrical honeycomb formed body by extrusion molding a green body comprising a ceramic raw material, a pore-forming material, a binder and a dispersion medium through a die defining an opening shape of the plurality of cells and an annular mask located downstream of the die and having an inner peripheral contour for defining an outer peripheral contour of the first end surface and the second end surface, such that a direction in which the cells extend is horizontal and a front side in a traveling direction of the extrusion molding is the first end surface, and a rear side is the second end surface, and then by cutting to a predetermined length;

a step B of obtaining a cylindrical honeycomb dried body by drying the cylindrical honeycomb formed body;

a step C of calculating:

$$(D_{1MIN}+D_{4MIN}+D_{6MIN})-(D_{2MIN}+D_{5MIN}+D_{8MIN})=E_{MIN1},$$

$$(D_{3MIN}+D_{6MIN}+D_{8MIN})-(D_{2MIN}+D_{4MIN}+D_{7MIN})=E_{MIN2},$$

$$(D_{2MIN}+D_{5MIN}+D_{8MIN})-(D_{1MIN}+D_{4MIN}+D_{6MIN})=E_{MIN3}, \text{ and}$$

$$(D_{2MIN}+D_{4MIN}+D_{7MIN})-(D_{3MIN}+D_{6MIN}+D_{8MIN})=E_{MIN4},$$

in which, assuming that a cross-section perpendicular to the direction in which the cells of the cylindrical honeycomb dried body extend is observed from the front side in the traveling direction of the extrusion molding of the step A, and a location on the outer peripheral side surface located at a vertex during the extrusion molding in the step A is 0 rad, with a clockwise direction as a + direction, $D_{1MIN}$ is defined as a minimum value of distance between a center of gravity position O and an outer peripheral contour of the cross-section in a central angle (rad) from $-1/8\pi$ to $+1/8\pi$, $D_{2MIN}$ is defined as a minimum value of distance between the center of gravity position O and the outer peripheral contour of the cross-section in a central angle (rad) from $+1/8\pi$ to $+3/8\pi$, $D_{3MIN}$ is defined as a minimum value of distance between the center of gravity position O and the outer peripheral contour of the cross-section in a central angle (rad) from $+3/8\pi$ to $+5/8\pi$, $D_{4MIN}$ is defined as a minimum value of distance between the center of gravity position O and the outer peripheral contour of the cross-section in a central angle (rad) from $+5/8\pi$ to $+7/8\pi$, $D_{5MIN}$ is defined as a minimum value of distance between the center of gravity position O and the outer peripheral contour of the cross-section in a central angle (rad) from $+7/8\pi$ to $+9/8\pi$, $D_{6MIN}$ is defined as a minimum value of distance between the center of gravity position O and the outer peripheral contour of the cross-section in a central angle (rad) from $+9/8\pi$ to $+11/8\pi$, $D_{7MIN}$ is defined as a minimum value of distance between the center of gravity position O and the outer peripheral contour of the cross-section in a central angle (rad) from $+11/8\pi$ to $+13/8\pi$, and $D_{8MIN}$ is defined as a minimum value of distance between the center of gravity position O and the outer peripheral contour of the cross-section in a central angle (rad) from $+13/8\pi$ to $+15/8\pi$;

a step D of specifying a minimum value among $E_{MIN1}$, $E_{MIN2}$, $E_{MIN3}$, and $E_{MIN4}$ calculated in the step C;

a step E of obtaining a cylindrical honeycomb fired body by placing the cylindrical honeycomb dried body on a shelf plate and firing it while passing it through a continuous firing furnace, such that the direction in which the cells of the cylindrical honeycomb dried body extend is parallel to a vertical direction and:

when the minimum value is $E_{MIN1}$, a location on the outer peripheral side surface corresponding to 0 rad is positioned at the front, when the minimum value is $E_{MIN2}$, a location on the outer peripheral side surface corresponding to $4/8 \pi$ rad is positioned at the front, when the minimum value is $E_{MIN3}$, a location on the outer peripheral side surface corresponding to $8/8 \pi$ rad is positioned at the front, and when the minimum value is $E_{MIN4}$, a location on the outer peripheral side surface corresponding to $12/8 \pi$ rad is positioned at the front.

[14] The method for manufacturing a cylindrical honeycomb fired body according to [13], wherein the step B comprises placing the honeycomb formed body in a dryer such that the direction in which the cells extend is the vertical direction, and drying it while passing it through the dryer such that the location on the outer peripheral side surface located at the vertex during the extrusion molding in the step A is positioned at the front.

[15] The method for manufacturing a cylindrical honeycomb fired body according to [13] or [14], comprising determining whether or not the minimum value specified in the step D satisfies a predetermined criterion, and performing the step E only when the minimum value satisfies the predetermined criterion.

[16] The method for manufacturing a cylindrical honeycomb fired body according to [15], comprising determining whether or not the minimum value specified in the step D satisfies the predetermined criterion, and when the minimum value does not satisfy the predetermined criterion, performing a step F instead of the step E, the step F comprising preparing an annular mask with a modified inner peripheral contour according to the minimum value, such that a minimum value among $E_{MIN1}$, $E_{MIN2}$, $E_{MIN3}$, and $E_{MIN4}$ of a next cylindrical honeycomb dried body to be prepared can satisfy the criterion; and the method further comprising thereafter repeating the steps A to D again provided that the modified annular mask is used.

[17] The method for manufacturing a cylindrical honeycomb fired body according to [15] or [16], wherein the predetermined criterion is that the minimum value is in the range of $-0.3$ mm to $-0.1$ mm.

[18] The method for manufacturing a cylindrical honeycomb fired body according to any one of [13] to [17], wherein for calculating $E_{MIN1}$, $E_{MIN2}$, $E_{MIN3}$, and $E_{MIN4}$, the step C comprises performing in sequence:

placing the cylindrical honeycomb dried body on a rotary stage with the first end surface or the second end surface facing upward; and continuously measuring distance using a displacement gauge between an arbitrary point on the outer peripheral side surface of the cylindrical honeycomb dried body and the displacement gauge while rotating the rotary stage for one revolution.

According to the method for manufacturing a cylindrical honeycomb fired body in one embodiment of the present invention, the yield in manufacturing a cylindrical honeycomb fired body is improved. For example, even if a dimensional error occurs in a level that is conventionally unacceptable in a cylindrical honeycomb dried body, which is a semi-finished product of a cylindrical honeycomb fired body, by adjusting the orientation of the cylindrical honeycomb dried body when passing it through a continuous firing furnace based on the shape of the cylindrical honeycomb dried body with the dimensional error, it is possible to manufacture a cylindrical honeycomb fired body within a range of dimensional tolerance. That is, it is possible to relax the dimensional tolerance at the stage of the cylindrical honeycomb dried body, so that the yield can be improved.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

(1. Cylindrical Honeycomb Fired Body)

According to one embodiment of the present invention, a method for manufacturing a cylindrical honeycomb fired body is provided. There are no particular restrictions on the use of the cylindrical honeycomb fired body. For example, it can be used for various industrial applications such as heat sinks, filters (for example, GPFs, DPFs), catalyst carriers, sliding components, nozzles, heat exchangers, electrical insulating members, and components for semiconductor manufacturing equipment.

Figure 1:
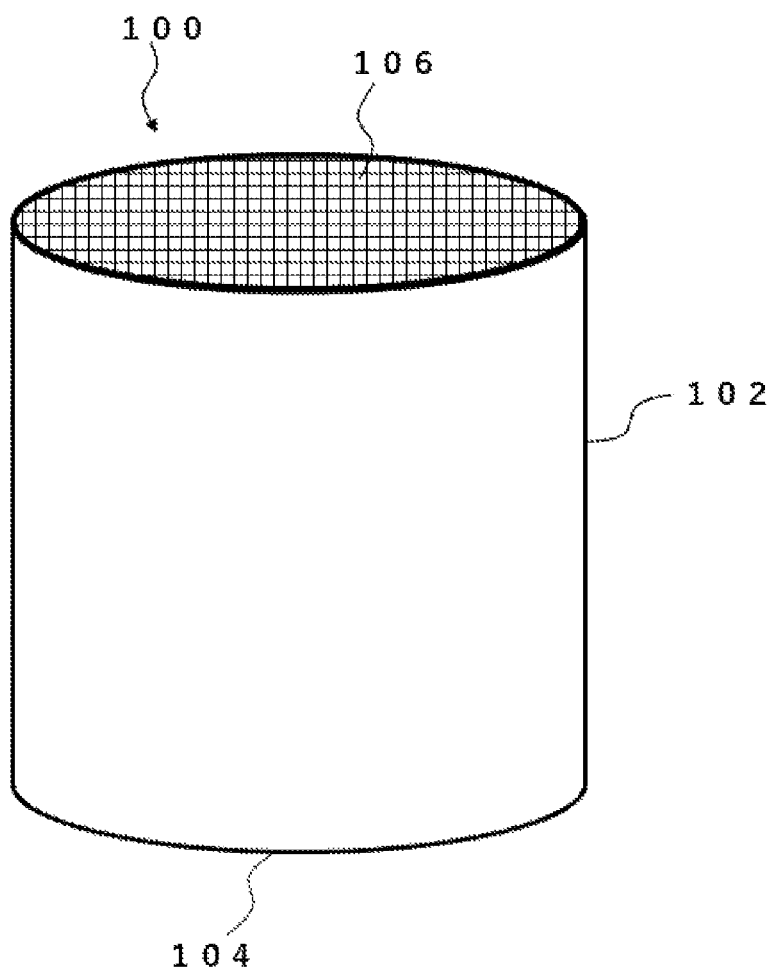
FIG. 1 is a perspective view schematically showing a wall-through type honeycomb fired body.
Figure 2:
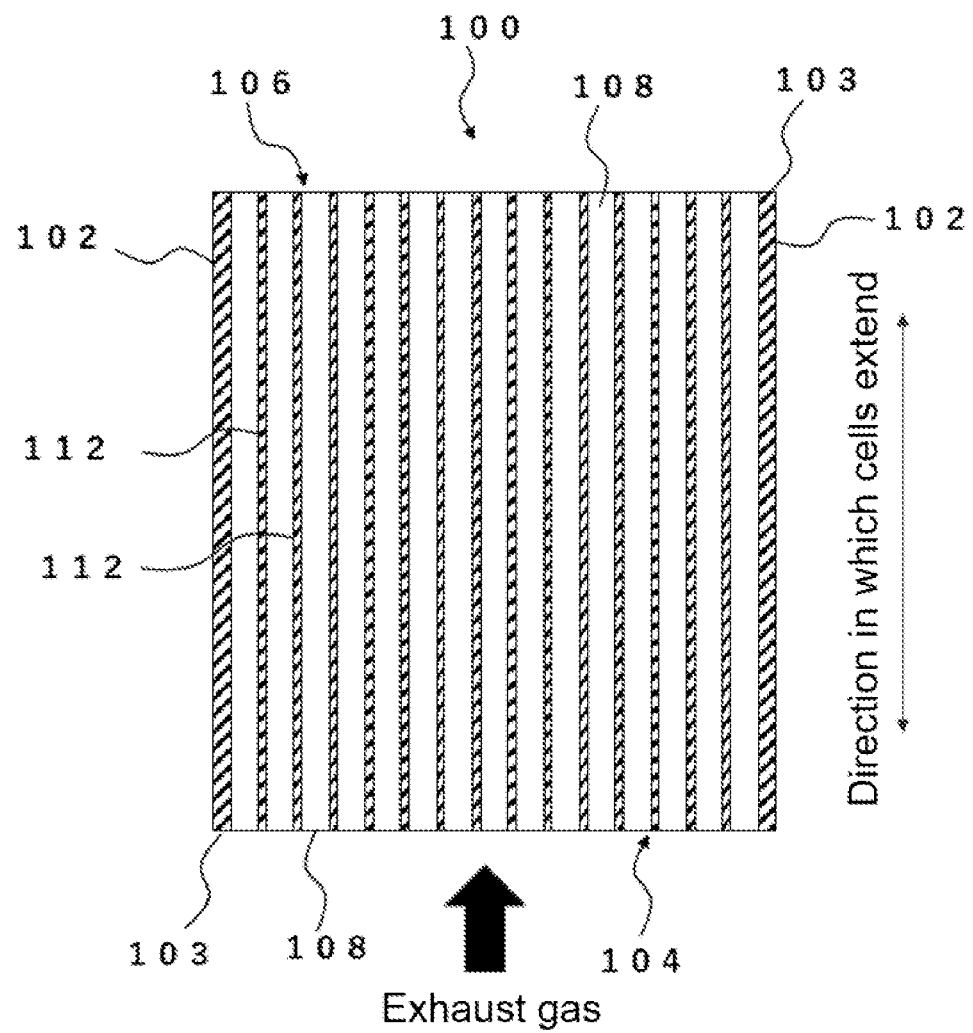
FIG. 2 is a schematic cross-sectional view of a wall-through type honeycomb fired body observed from a direction orthogonal to the direction in which the cells extend.

FIGS. 1 and 2 illustrate a schematic perspective view and a cross-sectional view, respectively, of a cylindrical honeycomb fired body 100 that can be applied as a wall-through type exhaust gas filter and/or a catalyst carrier for automobiles. The cylindrical honeycomb fired body 100 comprises a cylindrical honeycomb structure portion which comprises an outer peripheral side wall 103 having an outer peripheral side surface 102, and partition walls 112 disposed on an inner peripheral side of the outer peripheral side wall 103, the partition walls 112 partitioning a plurality of cells 108 forming flow paths from a first end surface 104 to a second end surface 106. In this cylindrical honeycomb fired body 100, both ends of each cell 108 are open, and an exhaust gas flowing into one cell 108 from the first end surface 104 is purified while passing through the cell 108, and flows out from the second end surface 106. The second end surface 106 may also be on the inlet side of the exhaust gas, and the first end surface 104 may also be on the outlet side of the exhaust gas.

Figure 3:
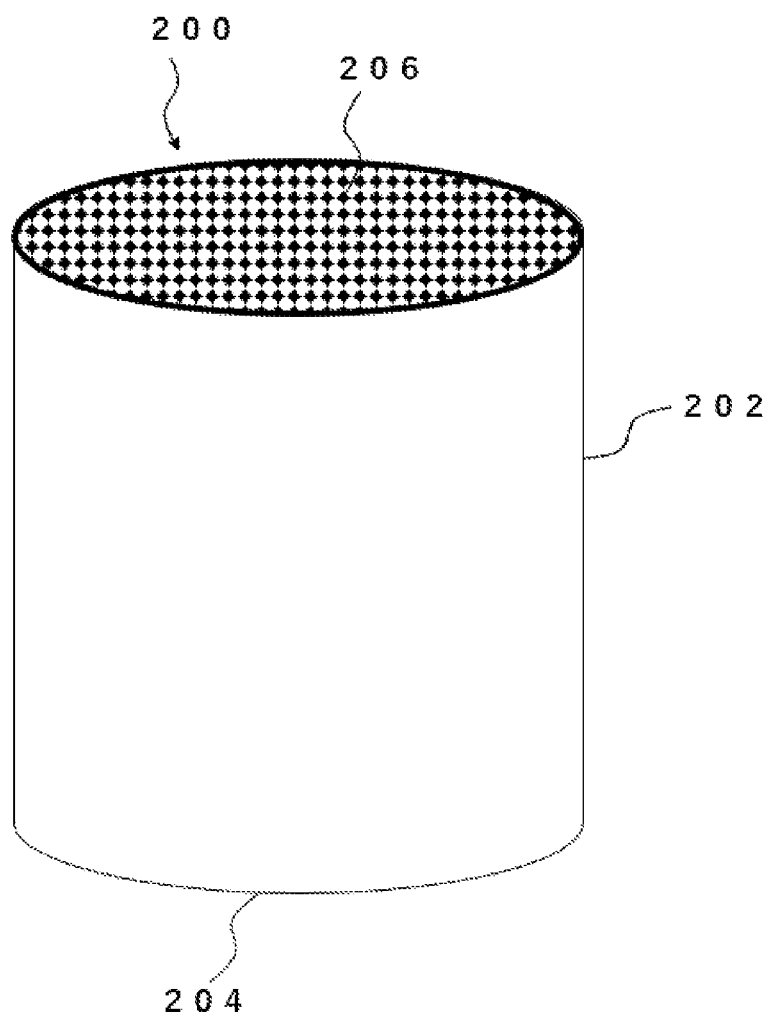
FIG. 3 is a perspective view schematically showing a wall-flow type honeycomb fired body.
Figure 4:
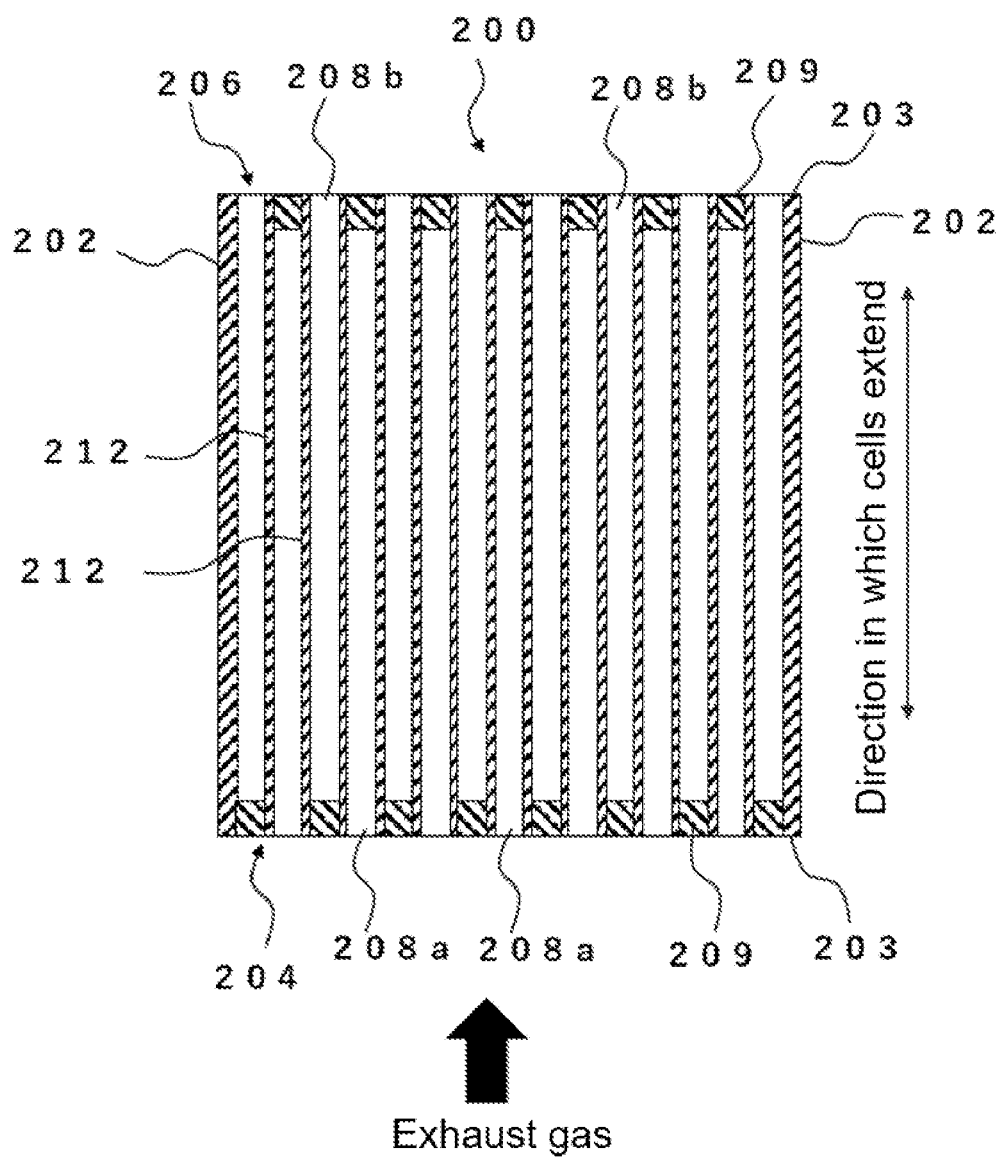
FIG. 4 is a schematic cross-sectional view of a wall-flow type honeycomb fired body observed from a direction orthogonal to the direction in which the cells extend.

FIGS. 3 and 4 illustrate a schematic perspective view and a cross-sectional view, respectively, of a cylindrical honeycomb fired body 200 that can be applied as a wall-flow type exhaust gas filter and/or a catalyst carrier for automobiles. The cylindrical honeycomb fired body 200 comprises a cylindrical honeycomb structure portion which comprises an outer peripheral side wall 203 having an outer peripheral side surface 202, and partition walls 212 disposed on an inner peripheral side of the outer peripheral side wall 203, the partition walls 212 partitioning a plurality of cells 208a, 208b forming flow paths for fluid from a first end surface 204 to a second end surface 206.

In the cylindrical honeycomb fired body 200, the plurality of cells 208a, 208b can be classified into a plurality of first cells 208a disposed on the inner side of the outer peripheral side wall 203, each extending from the first end surface 204 to the second end surface 206, opening on the first end surface 204 and having a sealing portion 209 on the second end surface 206, and a plurality of second cells 208b disposed on the inner side of the outer peripheral side wall 203, each extending from the first end surface 204 to the second end surface 206, having a sealing portion 209 on the first end surface 204 and opening on the second end surface 206. Further, in this cylindrical honeycomb fired body 200, the first cells 208a and the second cells 208b are alternately arranged adjacent to each other with the partition walls 212 interposed therebetween.

When an exhaust gas containing soot is supplied to the first end surface 204 on the upstream side of the cylindrical honeycomb fired body 200, the exhaust gas is introduced into the first cells 208a and proceeds downstream in the first cells 208a. Because the first cells 208a are sealed on the second end surface 206 on the downstream side, the exhaust gas passes through the porous partition walls 212 that partition the first cells 208a and the second cells 208b and flows into the second cells 208b. Since soot cannot pass through the partition walls 212, it is captured and deposited in the first cells 208a. After the soot is removed, the cleaned exhaust gas that has flowed into the second cells 208b proceeds downstream in the second cells 208b and flows out from the second end surface 206 on the downstream side. The second end surface 206 may also be on the inlet side of the exhaust gas, and the first end surface 204 may also be on the outlet side of the exhaust gas.

Examples of the material constituting the cylindrical honeycomb fired body include, but are not limited to, ceramics. As for the types of ceramics, mention can be made to cordierite, mullite, zirconium phosphate, aluminum titanate, silicon carbide (SiC), silicon-silicon carbide composite (for example, Si-bonded SiC), cordierite-silicon carbide composite, zirconia, spinel, indialite, sapphirine, corundum, titania, silicon nitride, and the like. Further, for these ceramics one type may be contained alone, and two or more types may be contained.

The height of the cylindrical honeycomb fired body (the length from the first end surface to the second end surface)

is not particularly limited and may be appropriately set according to the application and required performance. There is no particular limitation on the relationship between the height of the cylindrical honeycomb fired body and the diameter of each end surface. Therefore, the height of the cylindrical honeycomb fired body may be longer than the diameter of each end surface, or the height of the cylindrical honeycomb fired body may be shorter than the diameter of each end surface.

The area of each end surface of the cylindrical honeycomb fired body is not particularly limited, and it can be 40 to 250 cm$^2$ in one embodiment, can be 80 to 220 cm$^2$ in another embodiment, and can be 120 to 200 cm$^2$ in yet another embodiment.

The height of the cylindrical honeycomb fired body (flow path length of each cell) is not particularly limited, and it can be 40 to 200 mm in one embodiment, can be 60 to 180 mm in another embodiment. and can be 80 and 160 mm in yet another embodiment.

The shape of the end surfaces of the cylindrical honeycomb fired body and the cross-sectional shape perpendicular to the direction in which the cells extend are circular (perfect circle by design). In the present specification, the term "circular" includes not only perfect circles but also circles with dimensional errors during manufacturing. Therefore, the shape of the end surface of the cylindrical honeycomb fired body and the cross-sectional shape perpendicular to the direction in which the cells extend may not actually be a perfect circle, but are required to be within a predetermined dimensional tolerance. For example, a roundness of 2.0 mm or less is acceptable, and 1.6 mm or less is preferable. In the present specification, assuming that a cross-section perpendicular to the direction in which the cells of the cylindrical honeycomb fired body extend is observed at the center of the height of the cylindrical honeycomb fired body, the roundness of the cylindrical honeycomb fired body (same for a dried body and a formed body) is represented by roundness=$R_{MAX}-R_{MIN}$, in which $R_{MAX}$ is a maximum value and $R_{MIN}$ is a minimum value of the distances between the center of gravity position O and the outer peripheral contour of the cross-section when the distances are measured for one revolution in the peripheral direction. The roundness can be measured using a displacement gauge in the same manner as the amount of sag, which will be described later.

The shape of the cells in the cross-section perpendicular to the direction in which the cells extend is not limited, but is preferably a quadrangle, a hexagon, an octagon, or a combination thereof. Among these, squares and hexagons are preferred. By making the shape of the cells in this way, it is possible to reduce the pressure loss when a fluid is flowed through the cylindrical honeycomb fired body.

The thickness of the partition walls is preferably 50 μm or more, more preferably 60 μm or more, and even more preferably 70 μm or more, from the viewpoint of increasing the strength of the cylindrical honeycomb fired body. In addition, the thickness of the partition walls is preferably 150 μm or less, more preferably 130 μm or less, and even more preferably 100 μm or less, from the viewpoint of suppressing the pressure loss when a fluid is flowed through the cylindrical honeycomb fired body. In the present specification, the thickness of the partition wall refers to a crossing length of a line segment that crosses the partition wall when the centers of gravity of adjacent cells are connected by this line segment in a cross-section perpendicular to the direction in which the cells extend. The average thickness of partition wall refers to the average value of the thickness of all the partition walls.

The cell density (number of cells per unit cross-sectional area perpendicular to the direction in which the cells extend) is not particularly limited, but may be, for example, 6 to 2000 cells/square inch (0.9 to 311 cells/cm$^2$), more preferably 50 to 1000 cells/square inch (7.8 to 155 cells/cm$^2$), particularly preferably 100 to 600 cells/square inch (15.5 to 92.0 cells/cm$^2$). Here, the cell density is calculated by dividing the number of cells of one end surface of the cylindrical honeycomb fired body by the area of the end surface excluding the outer peripheral side wall (if there are sealed cells, it is calculated assuming the cells are not sealed).

The partition walls can be porous. The porosity of the partition wall may be appropriately adjusted according to the application, but from the viewpoint of suppressing the pressure loss of the fluid, it is preferably 25% or more, more preferably 35% or more, and even more preferably 45% or more. In addition, the porosity of the partition wall is preferably 80% or less, more preferably 75% or less, and even more preferably 70% or less, from the viewpoint of ensuring the strength of the cylindrical honeycomb fired body. The porosity is measured by a mercury intrusion method in accordance with JIS R1655: 2003 using a mercury porosimeter.

When the cylindrical honeycomb fired body is used as a catalyst carrier, the surface of the partition walls can be coated with a catalyst according to the purpose. The catalyst is not limited, but mention can be made to an oxidation catalyst (DOC) for raising the exhaust gas temperature by oxidative combustion of hydrocarbons (HC) and carbon monoxide (CO), a PM combustion catalyst that assists the combustion of PM such as soot, an SCR catalyst and an NSR catalyst for removing nitrogen oxides (NO$_x$), and a three-way catalyst capable of simultaneously removing hydrocarbons (HC), carbon monoxide (CO) and nitrogen oxides (NO$_x$). The catalyst can appropriately contain, for example, precious metals (Pt, Pd, Rh, and the like), alkali metals (Li, Na, K, Cs, and the like), alkaline earth metals (Mg, Ca, Ba, Sr, and the like), rare earths (Ce, Sm, Gd, Nd, Y, La, Pr, and the like), transition metals (Mn, Fe, Co, Ni, Cu, Zn, Sc, Ti, Zr, V, Cr, and the like) and the like.

(2. Method for Manufacturing Cylindrical Honeycomb Fired Body)

Hereinafter, each step of the method for manufacturing a cylindrical honeycomb fired body according to one embodiment of the present invention will be described in detail.

(Step A: Preparation of Cylindrical Honeycomb Formed Body)

In the step A, a green body containing a ceramic raw material, a pore-forming material, a binder and a dispersion medium is extrusion molded through a die defining an opening shape of the plurality of cells and an annular mask located downstream of the die and having an inner peripheral contour for defining an outer peripheral contour of the first end surface and the second end surface. The extrusion molding is performed in a direction such that the direction in which the cells extend is horizontal. After the extrusion molding, a cylindrical honeycomb formed body is prepared by cutting to a predetermined length with a cutting means such as a cutter. In the cylindrical honeycomb formed body obtained, the end surface on the front side in the traveling direction of the extrusion molding is called the first end surface, and the end surface on the rear side is called the second end surface.

The ceramic raw material is a raw material for the portion that remains after firing and constitutes the skeleton of the honeycomb fired body as ceramics, such as a metal oxide, a metal, or the like. The ceramic raw material can be provided, for example, in the form of powder. Examples of the ceramic raw material include a raw material for obtaining ceramics such as cordierite, mullite, zircon, aluminum titanate, silicon carbide, silicon nitride, zirconia, spinel, indialite, sapphirine, corundum, titania, and the like. Specific examples thereof include, but are not limited to, silica, talc, alumina, kaolin, serpentine, pyrophyllite, brucite, boehmite, mullite, magnesite, aluminum hydroxide, and the like. As the ceramic raw material, one type may be used alone, or two or more types may be used in combination.

In the case of filter applications such as DPF and GPF, cordierite can be preferably used as the ceramics. In this case, a cordierite-forming raw material can be used as the ceramic raw material. A cordierite-forming raw material is a raw material that becomes cordierite by firing. It is desirable that the cordierite-forming raw material have a chemical composition of alumina ($Al_2O_3$) (including the amount of aluminum hydroxide that converts to alumina): 30 to 45% by mass, magnesia (MgO): 11 to 17% by mass, and silica ($SiO2$): 42 to 57% by mass.

The pore-forming material is not particularly limited as long as it becomes pores after firing, and examples thereof include, wheat flour, starch, foam resin, water-absorbing resin, silica gel, carbon (for example, graphite), ceramic balloon, polyethylene, polystyrene, polypropylene, nylon, polyester, acrylic, phenol, foam resin (after foaming), foam resin (before foaming), and the like. As the pore-forming material, one type may be used alone, or two or more types may be used in combination. From the viewpoint of increasing the porosity of the cylindrical honeycomb fired body, the amount of the pore-forming material is preferably 0.5 parts by mass or more, more preferably 2 parts by mass or more, and even more preferably 3 parts by mass or more with respect to 100 parts by mass of the ceramic raw material. From the viewpoint of ensuring the strength of the cylindrical honeycomb fired body, the amount of the pore-forming material is preferably 10 parts by mass or less, more preferably 7 parts by mass or less, and even more preferably 4 parts by mass or less with respect to 100 parts by mass of the ceramic raw material.

Examples of the binder include organic binders such as methyl cellulose, hydroxypropylmethyl cellulose, hydroxypropoxyl cellulose, hydroxyethyl cellulose, carboxymethyl cellulose, and polyvinyl alcohol. In particular, it is preferable to use methyl cellulose and hydroxypropyl methyl cellulose in combination. Further, from the viewpoint of increasing the strength of the honeycomb formed body, the amount of the binder is preferably 4 parts by mass or more, more preferably 5 parts by mass or more, and even more preferably 6 parts by mass or more with respect to 100 parts by mass of the raw material. From the viewpoint of suppressing the occurrence of crack due to abnormal heat generation in the firing step, the amount of the binder is preferably 9 parts by mass or less, more preferably 8 parts by mass or less, and even more preferably 7 parts by mass or less with respect to 100 parts by mass of the ceramic raw material. As the binder, one type may be used alone, or two or more types may be used in combination.

Examples of the dispersion medium include water or a mixed solvent of water and an organic solvent such as alcohol, and water can be particularly preferably used. The amount of the dispersion medium of the cylindrical honeycomb formed body is preferably 20 to 90 parts by mass, more preferably 60 to 85 parts by mass, and even more preferably 70 to 80 parts by mass with respect to 100 parts by mass of the ceramic raw material. When the amount of water of the cylindrical honeycomb formed body is 20 parts by mass or more with respect to 100 parts by mass of the ceramic raw material, it is easy to obtain the advantage that the quality of the cylindrical honeycomb formed body is easy to stabilize. When the amount of water of the cylindrical honeycomb formed body is 90 parts by mass or less with respect to 100 parts by mass of the ceramic raw material, the amount of shrinkage during drying is small and deformation can be suppressed. In the present specification, the amount of water of the cylindrical honeycomb formed body refers to a value measured by a loss on drying method.

Additives such as a dispersant can be added to the green body as needed. As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

Figure 5:
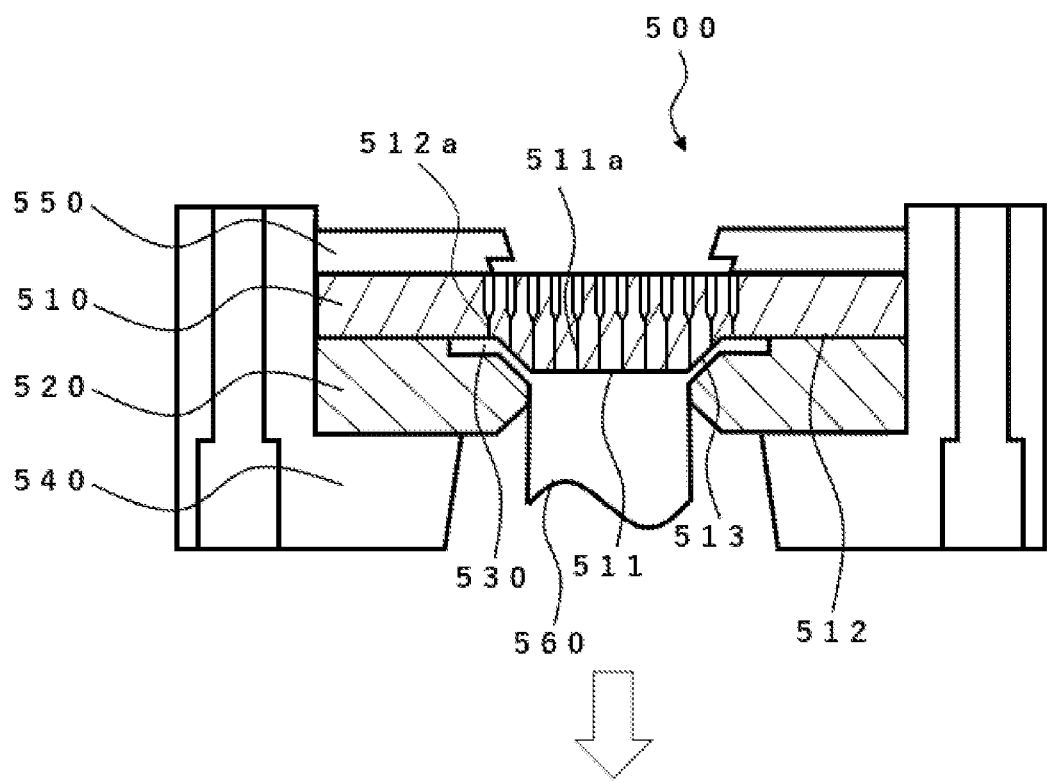
FIG. 5 is a schematic view showing a cross-sectional structure of an extrusion molding device when observed from a direction orthogonal to the extrusion direction.

FIG. 5 schematically shows the cross-sectional structure of an extrusion molding device when observed from a direction orthogonal to the extrusion direction. The extrusion molding device 500 comprises a die 510 having slits 511a, 512a for extruding raw materials for molding, and an annular mask 520 provided on the downstream side of the die 510. In the extrusion molding device 500, the die 510 has an inner portion 511 and an outer peripheral portion 512. The inner portion 511 projects to the downstream side (lower part in FIG. 5), and a step portion 513 is formed between the inner portion 511 and the outer peripheral portion 512. Further, the inner portion 511 is provided with a slit 511a that defines a honeycomb structure portion having a desired cell shape, partition wall thickness, cell density and the like. The outer peripheral portion 512 is provided with a slit 512a which is shorter than the slit 511a of the inner portion 511. A gap portion 530 for forming the outer peripheral wall of a honeycomb structure is formed between the die 510 and the annular mask 520. A back holding plate 550 for fixing the die 510 is attached to the upstream side of the die 510. Further, a holding jig 540 is attached so as to surround the outer peripheral side of the annular mask 520, the outer peripheral side of the die 510, and the outer peripheral side of the back holding plate 550 from the downstream side of the annular mask 520. The holding jig 540 serves as a holder for fixing the die 510 and the annular mask 520.

In extrusion molding by the extrusion molding device 500, the raw material for molding is extruded from the upstream side (upper part in FIG. 5) of the die 510 to the downstream side through the die 510 by an extruder (not shown). Then, the raw material for molding extruded from the slit 511a provided in the inner portion 511 of the die 510 whose downstream side is open forms a honeycomb structure portion having a plurality of cells. On the other hand, the raw material for molding extruded from the slit 512a provided in the outer peripheral portion 512 of the die 510 has its honeycomb structure crushed by the function of the gap portion 530 and changes its traveling direction from the extrusion direction to the direction along the step portion 513. After the raw material for molding passes through the gap portion 530, it changes its traveling direction again to the extrusion direction and forms the outer peripheral side wall surrounding the cells. In this way, the cylindrical honeycomb formed body 560 is continuously formed from the extrusion molding device 500. In this embodiment, the direction of extrusion molding is a horizontal direction, and extrusion molding is performed in a direction such that the direction in which the cells extend is horizontal. When the direction of extrusion molding is horizontal, it is advantageous for continuously forming long cylindrical honeycomb formed bodies.

Figure 6:
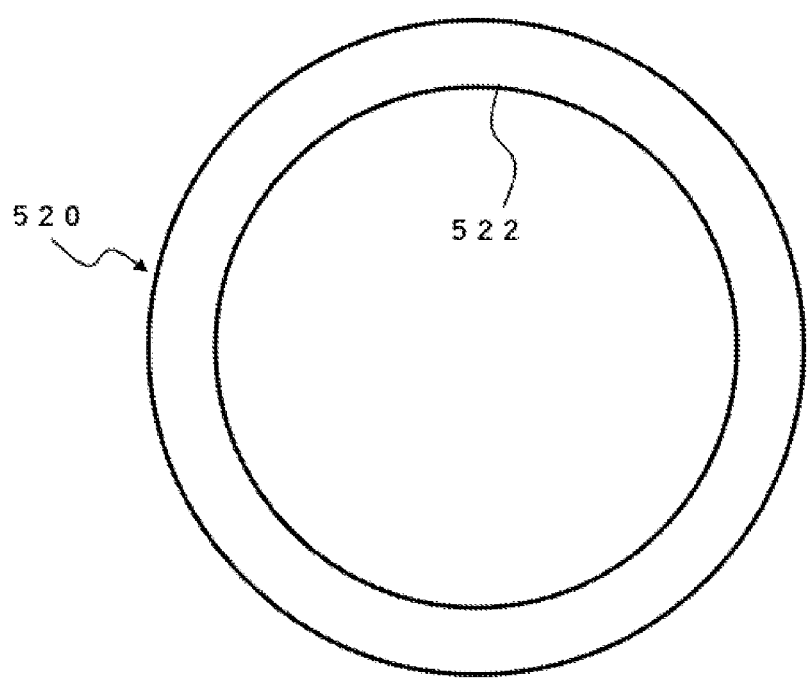
FIG. 6 is a schematic front view of an annular mask.

FIG. 6 shows a schematic front view of the annular mask 520. The annular mask 520 has an inner peripheral contour 522 for defining the outer peripheral contour of the first end surface and the second end surface of the cylindrical honeycomb formed body. The inner peripheral contour 522 of the annular mask 520 used in the step A may have a similar figure to the designed contour of the first end surface and the second end surface of the cylindrical honeycomb formed body, or may have a non-similar figure.

Cylindrical honeycomb formed bodies may not be perfectly circular due to dimensional errors occurring during extrusion molding, or may be intentionally not perfectly circular in consideration of non-uniform firing shrinkage in the subsequent firing process. However, it is required to be within a predetermined dimensional tolerance. For example, the cylindrical honeycomb formed body will be accepted if it can have a roundness of 2.0 mm or less, preferably 1.6 mm or less. The method for measuring the roundness is as described above.

(Step B: Drying of Cylindrical Honeycomb Formed Body)

Next, a step B of drying the cylindrical honeycomb formed body to obtain a cylindrical honeycomb dried body is carried out. In the drying step, for example, conventionally known drying method such as hot gas drying, microwave drying, dielectric drying, reduced-pressure drying, vacuum drying, freeze drying and the like can be used. Among these, a drying method combining hot gas drying with microwave drying or dielectric drying is preferable in that the entire formed body can be dried quickly and uniformly. There are no particular restrictions on the orientation of the cylindrical honeycomb formed body in the step B. Further, a batch-type dryer may be used, and a continuous-type dryer may be used. Considering mass production and quality stability, it is preferable to place the cylindrical honeycomb formed body in a dryer such that the direction in which the cells extend is the vertical direction, and dry it while passing it through the dryer such that the location on the outer peripheral side surface located at the vertex during the extrusion molding in the step A is positioned at the front.

When forming sealing portions, the sealing portions are formed on both end surfaces of the dried cylindrical honeycomb formed body and then the sealing portions are dried to obtain a cylindrical honeycomb dried body. The material of the sealing portion is not particularly limited, but ceramics are preferable from the viewpoint of strength and heat resistance. As the ceramics, those comprising at least one selected from the group consisting of cordierite, mullite, zircon, aluminum titanate, silicon carbide, silicon nitride, zirconia, spinel, indialite, sapphirine, corundum, and titania are preferable. The sealing portion is preferably formed of a material containing 50% by mass or more of these ceramics, and more preferably formed of a material containing 80% by mass or more of these ceramics in total. It is even more preferable that the sealing portion have the same material composition as the main body portion of the honeycomb formed body because the expansion coefficient at the time of firing can be made the same so that the durability is improved.

An exemplary method for forming the sealing portions will be described. A sealing slurry is stored in a storage container. Next, a mask having openings at positions corresponding to the cells on which the sealing portions should be formed is attached to one of the end surfaces. The end surface with the mask attached is immersed in the storage container, and the openings are filled with the sealing slurry to form the sealing portions. Sealing portions can also be formed on the other end surface in the same manner.

(Step C: Measurement of Amount of Sag for Cylindrical Honeycomb Dried Body)

In the step C, assuming that a cross-section perpendicular to the direction in which the cells of the cylindrical honeycomb dried body extend is observed from the front side in the traveling direction of the extrusion molding of the step A, predetermined parameters ($E_{AVE1}$, $E_{AVE2}$, $E_{AVE3}$, and $E_{AVE4}$) are calculated from an average value of distance between a center of gravity position O and an outer peripheral contour in a plurality of predetermined angle ranges. In this specification, the value of the parameter is called "amount of sag". In order to directly observe a cross-section perpendicular to the direction in which the cells of the cylindrical honeycomb dried body extend, it is necessary to cut the cylindrical honeycomb dried body. However, it is impossible to destroy the cylindrical honeycomb dried body during manufacture. Therefore, in the step C, the amount of sag is calculated assuming that the cross-section is observed from the front side in the traveling direction of the extrusion molding of the step A.

The calculation of amount of sag assuming that the cross-section perpendicular to the direction in which the cells of the cylindrical honeycomb dried body is observed from the front side in the traveling direction of the extrusion molding in the step A can be performed non-destructively using, for example, a displacement gauge. The type of the displacement gauge is not particularly limited, but examples thereof include an optical type, an eddy current type, an ultrasonic type, a laser focus type, and the like. In one embodiment, in the step C, for the calculation of $E_{AVE1}$, $E_{AVE2}$, $E_{AVE3}$, and $E_{AVE4}$, a step of placing the cylindrical honeycomb dried body on a rotary stage with the first end surface or the second end surface facing upward, and a step of continuously measuring the distance using a displacement gauge between an arbitrary point on the outer peripheral side surface of the cylindrical honeycomb dried body and the displacement gauge while rotating the rotary stage for one revolution are carried out.

Figure 7:
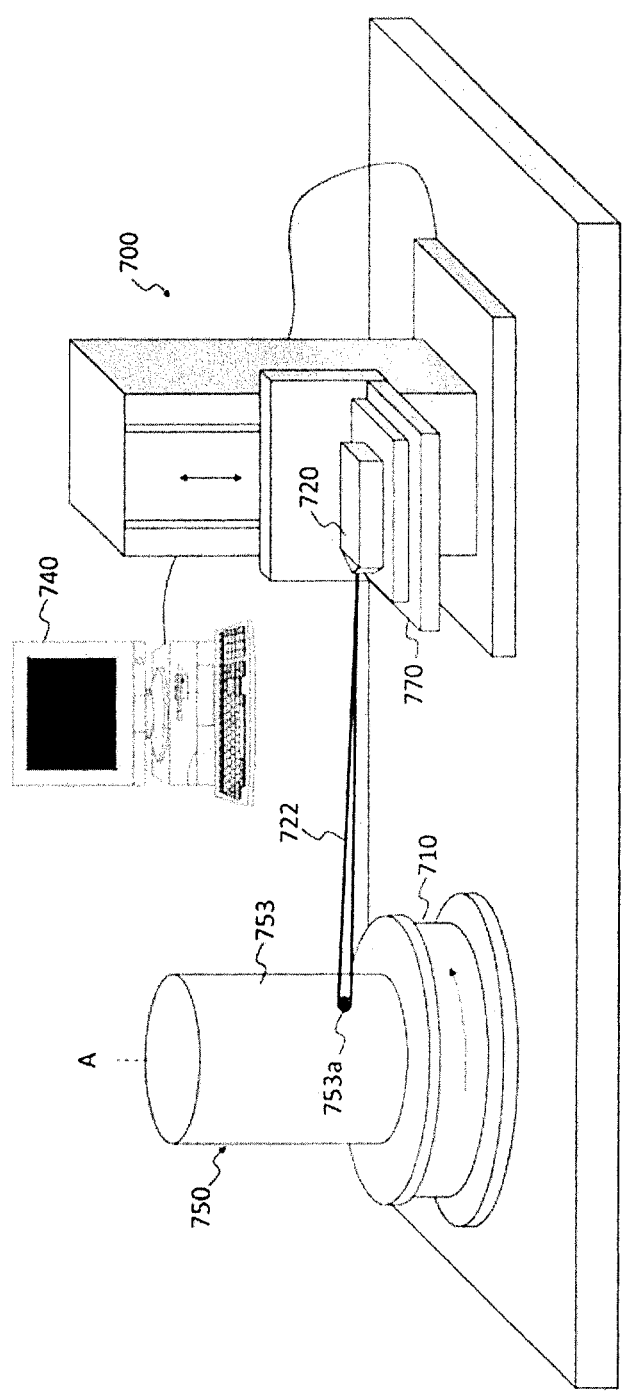
FIG. 7 is a schematic perspective view for explaining the configuration of a shape measuring device suitable for carrying out the step C using a displacement gauge.

FIG. 7 shows a schematic perspective view for explaining the configuration of a shape measuring device 700 suitable for carrying out the step C using a displacement gauge. In one embodiment, the shape measuring device 700 may comprises a rotary stage 710 on which a cylindrical honeycomb dried body 750 is placed and which can rotate around a rotation axis A; a displacement gauge 720 capable of irradiating the outer peripheral side surface 753 of the cylindrical honeycomb dried body 750 with laser 722; a computer 740 capable of calculating the amount of sag based on the measurement result of the displacement gauge 720; and a Z stage 770 on which the displacement gauge 720 is mounted and which can move in the vertical direction.

The rotary stage 710 is configured to be rotatable at a predetermined rotational speed by driving means such as a servomotor about the rotating axis A extending in the vertical direction. The servomotor can be equipped with an encoder for detecting the amount of displacement such as the rotation angle of the rotary stage 710.

The Z stage 770 can be moved by a driving means such as a motor. As an example, the Z stage 770 can be configured by using an electrical actuator such as a ROBO Cylinder. The electric actuator can be composed of linear guides, ball screws, servomotors, and the like. The servomotor can be equipped with an encoder for detecting the amount of displacement of the Z stage 770.

An implementation procedure of the step C using the shape measuring device 700 will be exemplified. First, the cylindrical honeycomb dried body 750 is placed on the rotary stage 710 with the first end surface or the second end surface facing upward. When the cylindrical honeycomb dried body 750 is placed on the rotary stage 710, the distance between the center of gravity position O of the upper end surface (the first end surface or the second end surface) and the rotation axis A of the rotary stage 710 does not necessarily have to be zero, and even if the two are apart from each other, the radius R (the distance between the center of gravity position O and the outer peripheral contour), which will be described later, can be geometrically calculated, and can also be automatically calculated by the displacement gauge. Typically, it is desirable that the distance is 30 mm or less, preferably 20 mm or less, and more preferably 10 mm or less. As a result, when the cylindrical honeycomb dried body 750 rotates on the rotary stage 710, there is an advantage that the eccentricity is suppressed and the measurement by the displacement gauge can be stabilized.

Next, the height position of the outer peripheral side surface 753, which is irradiated with the laser 722, of the cylindrical honeycomb dried body 750 placed on the rotary stage 710 is adjusted by moving the Z stage 770 in the vertical direction. The height position of the outer peripheral side surface 753 irradiated with the laser 722 is not particularly limited, but it is desirable to fix it during the measurement in order to improve the measurement accuracy.

Figure 8:
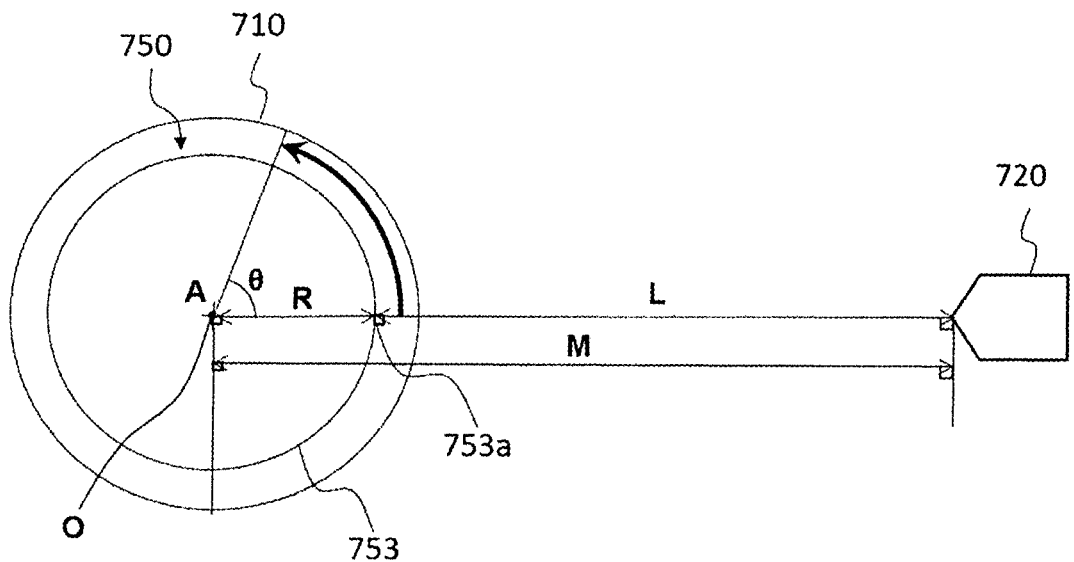
FIG. 8 is a schematic diagram for explaining a method of determining the distance (radius R) between the center of gravity position O and the outer peripheral contour in the cross-section of a cylindrical honeycomb dried body using a displacement gauge.

Next, while rotating the rotary stage 710 for one revolution, the distance L between an arbitrary point 753a on the outer peripheral side surface 753 and the displacement gauge 720 is continuously measured. Here, "continuously measured" means that the distance L is measured at least once while the rotary stage 710 rotates by 1°, and considering the measurement accuracy and the efficiency of data processing, it is preferable to measure the distance L once while the rotary stage 710 rotates from 0.05° to 0.5°, and it is more preferable to measure the distance L once while the rotary stage 710 rotates from 0.1° to 0.3°. In the case of continuously measuring the distance L between the arbitrary point 753a on the outer peripheral side surface 753 and the displacement gauge 720 in the normal direction of the point 753a, assuming that the distance between the rotation axis A of the rotary stage 710 and the displacement gauge is M, the distance (radius R) between the center of gravity position O at this measurement point and the outer peripheral contour in the cross-section of the cylindrical honeycomb dried body 750 is represented by R=M−L (see FIG. 8). In addition, the distance L between the arbitrary point 753a on the outer peripheral side surface 753 and the displacement gauge 720 does not need to be the distance in the normal direction at the point 753a on the outer peripheral side surface 753, and even if the distance is in other directions, the radius R can be geometrically calculated, and also can be calculated automatically by the displacement gauge. Therefore, the change in the radius R of the cylindrical honeycomb dried body 750 for one revolution can be measured by this measurement. The change in radius R for one revolution can be stored in a memory or the like in the computer 740 in association with a rotation angle θ of the rotary stage 710. This makes it possible to associate the radius R with a specific point on the outer peripheral side surface.

In the step of continuously measuring the distance L between the arbitrary point 753a on the outer peripheral side surface 753 of the cylindrical honeycomb dried body 750 and the displacement gauge 720 using the displacement gauge 720 while rotating the rotary stage 710 for one revolution, it is preferable to set the peripheral speed of the outer peripheral side surface 753 so that the inspection can be performed quickly while improving the measurement accuracy. Although not limited, in one embodiment, the measurement step can be performed while rotating the cylindrical honeycomb dried body 750 at an average peripheral speed of 200 to 1200 mm/sec. In view of rapid measurement, the lower limit of the average peripheral speed is preferably 235 mm/sec or more. Moreover, from the viewpoint of increasing the measurement accuracy, the upper limit of the average peripheral speed is preferably 1000 mm/sec or less.

Figure 9:
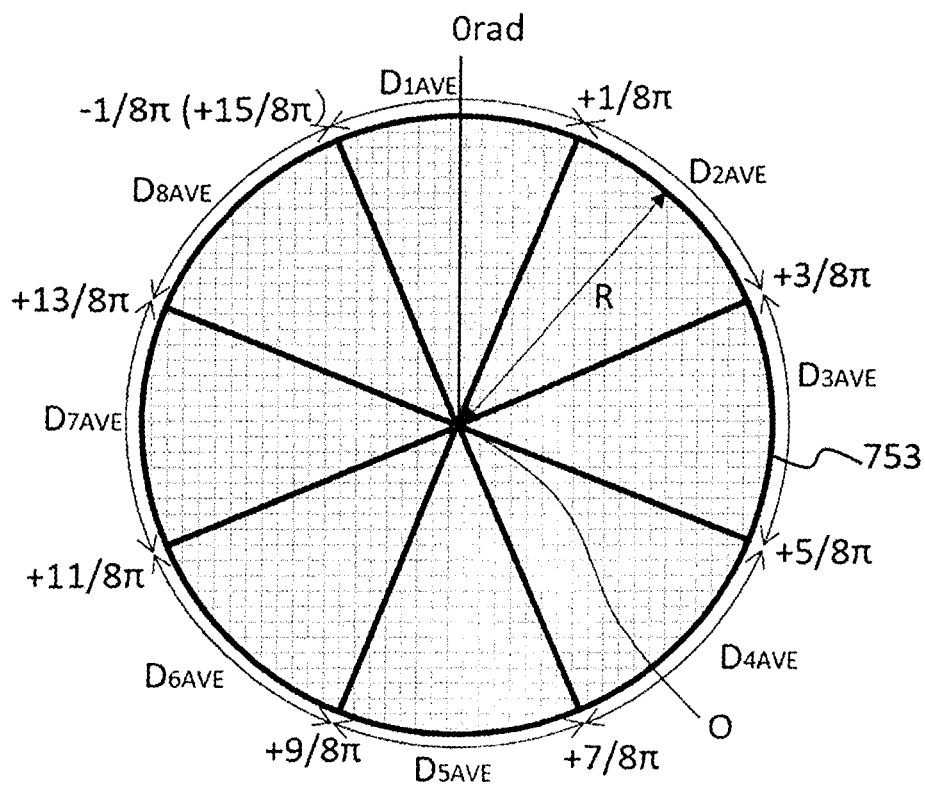
FIG. 9 is a schematic diagram for explaining the relationship between a cross-section of a cylindrical honeycomb dried body and $D_{1AVE}$, $D_{2AVE}$, $D_{3AVE}$, $D_{4AVE}$, $D_{5AVE}$, $D_{6AVE}$, $D_{7AVE}$, and $D_{8AVE}$.

By the above procedure, the change in the radius R of the cylindrical honeycomb dried body 750 in the cross-section for one revolution can be grasped in association with the rotation angle θ of the rotary stage 710, assuming that the cross-section perpendicular to the direction in which the cells of the cylindrical honeycomb dried body 750 extend is observed from the front side in the traveling direction of the extrusion molding in the step A. Therefore, $D_{1AVE}$, $D_{2AVE}$, $D_{3AVE}$, $D_{4AVE}$, $D_{5AVE}$, $D_{6AVE}$, $D_{7AVE}$, $D_{8AVE}$ and the amount of sag ($E_{AVE1}$, $E_{AVE2}$, $E_{AVE3}$, and $E_{AVE4}$) can be calculated. These values may be automatically calculated by computer 740. $E_{AVE1}$, $E_{AVE2}$, $E_{AVE3}$, and $E_{AVE4}$ are defined as follows.

$$E_{AVE1} = (D_{1AVE} + D_{4AVE} + D_{6AVE}) - (D_{2AVE} + D_{5AVE} + D_{8AVE})$$

$$E_{AVE2} = (D_{3AVE} + D_{6AVE} + D_{8AVE}) - (D_{2AVE} + D_{4AVE} + D_{7AVE})$$

$$E_{AVE3} = (D_{2AVE} + D_{5AVE} + D_{8AVE}) - (D_{1AVE} + D_{4AVE} + D_{6AVE})$$

$$E_{AVE4} = (D_{2AVE} + D_{4AVE} + D_{7AVE}) - (D_{3AVE} + D_{6AVE} + D_{8AVE})$$

in which, assuming the location on the outer peripheral side surface located at the vertex during the extrusion molding in the step A is 0 rad, with a clockwise direction as the + direction, $D_{1AVE}$ is defined as an average value of distance (radius R) between a center of gravity position O and an outer peripheral contour of the cross-section in a central angle (rad) from $-\frac{1}{8}\pi$ to $+\frac{1}{8}\pi$, $D_{2AVE}$ is defined as an average value of distance (radius R) between the center of gravity position O and the outer peripheral contour of the cross-section in a central angle (rad) from $+\frac{1}{8}\pi$ to $+\frac{3}{8}\pi$, $D_{3AVE}$ is defined as an average value of distance (radius R) between the center of gravity position O and the outer peripheral contour of the cross-section in a central angle (rad) from $+\frac{3}{8}\pi$ to $+\frac{5}{8}\pi$, $D_{4AVE}$ is defined as an average value of distance (radius R) between the center of gravity position O and the outer peripheral contour of the cross-section in a central angle (rad) from $+\frac{5}{8}\pi$ to $+\frac{7}{8}\pi$, $D_{5AVE}$ is defined as an average value of distance (radius R) between the center of gravity position O and the outer peripheral contour of the cross-section in a central angle (rad) from $+\frac{7}{8}\pi$ to $+9/8\pi$, $D_{6AVE}$ is defined as an average value of distance (radius R) between the center of gravity position O and the outer peripheral contour of the cross-section in a central angle (rad) from $+9/8\pi$ to $+11/8\pi$, $D_{7AVE}$ is defined as an average value of distance (radius R) between the center of gravity position O and the outer peripheral contour of the cross-section in a central angle (rad) from $+11/8\pi$ to $+13/8\pi$, and $D_{8AVE}$ is defined as an average value of distance (radius R) between the center of gravity position O and the outer peripheral contour of the cross-section in a central angle (rad) from +13/8π to +15/8π (see FIG. 9).

(Step D: Specifying Minimum Value Among $E_{AVE1}$, $E_{AVE2}$, $E_{AVE3}$, and $E_{AVE4}$)

In the step D, among the amount of sag $E_{AVE1}$, $E_{AVE2}$, $E_{AVE3}$, and $E_{AVE4}$ calculated in the step C, the minimum value is specified. This is for the purpose of determining the orientation of the cylindrical honeycomb dried body for firing in the continuous firing furnace based on the minimum amount of sag among $E_{AVE1}$, $E_{AVE2}$, $E_{AVE3}$, and $E_{AVE4}$. Experience shows that the smallest of $E_{AVE1}$, $E_{AVE2}$, $E_{AVE3}$, and $E_{AVE4}$ is often a negative value. However, it is difficult to predict which of $E_{AVE1}$, $E_{AVE2}$, $E_{AVE3}$, and $E_{AVE4}$ will have the smallest value.

For example, if $(D_{1AVE}+D_{4AVE}+D_{6AVE})-(D_{2AVE}+D_{5AVE}+D_{8AVE})=E_{AVE1}$ is the minimum value and is negative, it means the radius R from +1/8π to +3/8π, the radius R from +7/8π to +9/8π, and the radius R from +13/8π to +15/8π are relatively long and deviate from a perfect circle.

(Step E: Firing of Cylindrical Honeycomb Dried Body)

In the step E, a cylindrical honeycomb fired body is obtained by placing the cylindrical honeycomb dried body on a shelf plate and firing it while passing it through a continuous firing furnace, such that the direction in which the cells of the cylindrical honeycomb dried body extend is parallel to a vertical direction, and a particular location on the outer peripheral side surface determined according to the minimum value is positioned at the front. It does not matter which end surface of the cylindrical honeycomb dried body faces upward. The firing step can be carried out, for example, by heating a calcined body to 1400 to 1450° C. in an air atmosphere and maintaining it for 3 to 10 hours, depending on the material composition of the cylindrical honeycomb dried body.

Figure 10:
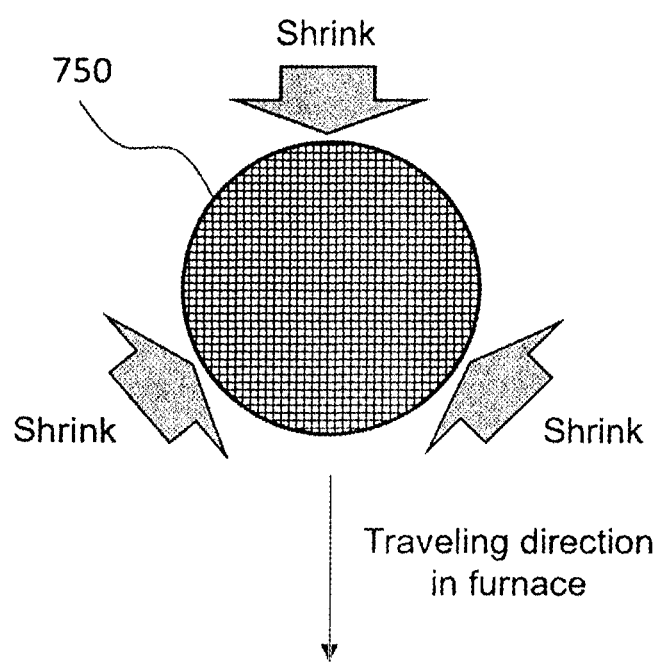
FIG. 10 is a schematic diagram for explaining the relationship between the traveling direction of a cylindrical honeycomb dried body in a firing furnace and locations on the outer peripheral side surface where firing shrinkage is large.

When the cylindrical honeycomb dried body is placed on a shelf plate such that the direction in which the cells extend is parallel to a vertical direction and fired while passing it through a continuous firing furnace, it is empirically known that firing shrinkage in the radial direction tends to be relatively large in the vicinity of the outer peripheral side surface locations at around 45° diagonally right, around 45° diagonally left, and around 180° backward with respect to the traveling direction. This is schematically shown in FIG. 10. Although it is not intended that the present invention be limited by any theory, it is believed that this is due to the direction of the wind in the firing furnace and the difference in temperature distribution within the body. By performing the step D, the location of the outer peripheral side surface where the length in the radial direction of the cylindrical honeycomb dried body is relatively large has already been grasped based on the minimum value of the amount of sag. Therefore, in the firing step, if the cylindrical honeycomb dried body is fired in the orientation that can approach a perfect circle by a combination of the above experimental rule, it is possible to correct the deformation occurred during drying.

Specifically, when the minimum value is $E_{AVE1}$, a location on the outer peripheral side surface corresponding to 0 rad is positioned at the front, when the minimum value is $E_{AVE2}$, a location on the outer peripheral side surface corresponding to 4/8 π rad is positioned at the front, when the minimum value is $E_{AVE3}$, a location on the outer peripheral side surface corresponding to 8/8 π rad is positioned at the front, and when the minimum value is $E_{AVE4}$, a location on the outer peripheral side surface corresponding to 12/8 π rad is positioned at the front.

For example, as mentioned earlier, when the minimum value is $E_{AVE1}$, the radius R from +1/8π to +3/8π, the radius R from +7/8π to +9/8π, and the radius R from +13/8π to +15/8π are relatively long and deviate from a perfect circle. Accordingly, by placing the cylindrical honeycomb dried body on the shelf plate such that the location of the outer peripheral side surface corresponding to 0 rad is positioned at the front, the firing shrinkage in the radial direction becomes relatively large in the vicinity of the outer peripheral side surface locations at around 45° diagonally right (around +2/8π), around 45° diagonally left (around +14/8π), and around 180° backward (around +8/8π) with respect to the traveling direction. It is empirically found that if the cylindrical honeycomb dried body is randomly oriented and fired, the roundness of the fired body deteriorates by about 0.2 mm on average compared to the dried body. However, it is possible to suppress the deterioration of the roundness, and preferably to improve the roundness, by making the outer peripheral side locations corresponding to these locations shrink more than the other outer peripheral side surface locations during firing.

However, although the deformation of the cylindrical honeycomb dried body can be corrected during firing, there is a limit to the degree of correction. Therefore, it is possible to determine whether or not the minimum value specified in the step D satisfies a predetermined criterion, and the step E may be performed only when the minimum value satisfies the criterion. According to studies by the present inventors, when the cylindrical honeycomb dried body is placed on a shelf plate by the above-described placing method and fired using a continuous firing furnace, the minimum value increases by about 0.2 mm regardless of the diameter and material of the cylindrical honeycomb dried body. Therefore, it is preferable that a predetermined criterion is that the minimum value is in the range of −0.3 mm to −0.1 mm, from the viewpoint of making the cross-section of the cylindrical honeycomb fired body closer to a perfect circle.

Further, it is preferable to determine whether or not the minimum value specified in the step D satisfies a predetermined criterion, and when the minimum value does not satisfy the predetermined criterion, it is preferable to carry out a step F instead of the step E, the step F comprising preparing an annular mask with a modified inner peripheral contour according to the minimum value, such that the minimum value among $E_{AVE1}$, $E_{AVE2}$, $E_{AVE3}$, and $E_{AVE4}$ of a next cylindrical honeycomb dried body to be prepared can satisfy the criterion, and thereafter, to repeat the steps A to D again provided that the modified annular mask is used.

For example, in the case where the minimum value of the cylindrical honeycomb dried body is $E_{AVE1}=-0.4$ mm and the predetermined criterion is "the minimum value is in the range of −0.3 mm to −0.1 mm", the annular mask can be modified such that $E_{AVE1}$ approaches −0.2 mm. More specifically, since $E_{AVE1}=(D_{1AVE}+D_{4AVE}+D_{6AVE})-(D_{2AVE}+D_{5AVE}+D_{8AVE})$, it is conceivable to relatively reduce the diameters (narrow the inner peripheral contour) of the annular mask at the locations corresponding to $D_{2AVE}$, $D_{5AVE}$, and $D_{8AVE}$.

In the present embodiment, the amount of sag is calculated based on the "average value" of the distance between the center of gravity position O and the outer peripheral contour in a plurality of predetermined angular ranges for the cross-section of the cylindrical honeycomb dried body. However, the amount of sag may also be defined by a "maximum value" or a "minimum value" instead of the "average value".

Therefore, in another embodiment of the invention, in the step C, the following are calculated:

$$(D_{1MAX}+D_{4MAX}+D_{6MAX})-(D_{2MAX}+D_{5MAX}+D_{8MAX})=E_{MAX1},$$

$$(D_{3MAX}+D_{6MAX}+D_{8MAX})-(D_{2MAX}+D_{4MAX}+D_{7MAX})=E_{MAX2},$$

$$(D_{2MAX}+D_{5MAX}+D_{8MAX})-(D_{1MAX}+D_{4MAX}+D_{6MAX})=E_{MAX3}, \text{ and}$$

$$(D_{2MAX}+D_{4MAX}+D_{7MAX})-(D_{3MAX}+D_{6MAX}+D_{8MAX})=E_{MAX4}.$$

in which, assuming the location on the outer peripheral side surface located at the vertex during the extrusion molding in the step A is 0 rad, with a clockwise direction as the + direction, $D_{1MAX}$ is defined as a maximum value of distance between a center of gravity position O and an outer peripheral contour of the cross-section in a central angle (rad) from $-1/8\pi$ to $+1/8\pi$, $D_{2MAX}$ is defined as a maximum value of distance between the center of gravity position O and the outer peripheral contour of the cross-section in a central angle (rad) from $+1/8\pi$ to $+3/8\pi$, $D_{3MAX}$ is defined as a maximum value of distance between the center of gravity position O and the outer peripheral contour of the cross-section in a central angle (rad) from $+3/8\pi$ to $+5/8\pi$, $D_{4MAX}$ is defined as a maximum value of distance between the center of gravity position O and the outer peripheral contour of the cross-section in a central angle (rad) from $+5/8\pi$ to $+7/8\pi$, $D_{5MAX}$ is defined as a maximum value of distance between the center of gravity position O and the outer peripheral contour of the cross-section in a central angle (rad) from $+7/8\pi$ to $+9/8\pi$, $D_{6MAX}$ is defined as a maximum value of distance between the center of gravity position O and the outer peripheral contour of the cross-section in a central angle (rad) from $+9/8\pi$ to $+11/8\pi$, $D_{7MAX}$ is defined as a maximum value of distance between the center of gravity position O and the outer peripheral contour of the cross-section in a central angle (rad) from $+11/8\pi$ to $+13/8\pi$, and $D_{8MAX}$ is defined as a maximum value of distance between the center of gravity position O and the outer peripheral contour of the cross-section in a central angle (rad) from $+13/8\pi$ to $+15/8\pi$.

$E_{MAX1}$, $E_{MAX2}$, $E_{MAX3}$, and $E_{MAX4}$ can be calculated based on measurement results using a displacement gauge in a manner similar to $E_{AVE1}$, $E_{AVE2}$, $E_{AVE3}$, and $E_{AVE4}$.

Further, in another embodiment of the present invention, in the step D, the minimum value among $E_{MAX1}$, $E_{MAX2}$, $E_{MAX3}$, and $E_{MAX4}$ calculated in the step C is specified.

Further, in another embodiment of the present invention, in the step E, a cylindrical honeycomb fired body is obtained by:

placing the cylindrical honeycomb dried body on a shelf plate and firing it while passing it through a continuous firing furnace, such that the direction in which the cells of the cylindrical honeycomb dried body extend is parallel to a vertical direction, and when the minimum value is $E_{MAX1}$, a location on the outer peripheral side surface corresponding to 0 rad is positioned at the front, when the minimum value is $E_{MAX2}$, a location on the outer peripheral side surface corresponding to $4/8 \pi$ rad is positioned at the front, when the minimum value is $E_{MAX3}$, a location on the outer peripheral side surface corresponding to $8/8 \pi$ rad is positioned at the front, and when the minimum value is $E_{MAX4}$, a location on the outer peripheral side surface corresponding to $12/8 \pi$ rad is positioned at the front.

Further, in another embodiment of the present invention, it is determined whether or not the minimum value among $E_{MAX1}$, $E_{MAX2}$, $E_{MAX3}$, and $E_{MAX4}$ specified in the step D satisfies a predetermined criterion, and the step E is performed only when the minimum value satisfies the predetermined criterion.

Further, in another embodiment of the present invention, it is determined whether or not the minimum value among $E_{MAX1}$, $E_{MAX2}$, $E_{MAX3}$, and $E_{MAX4}$ specified in the step D satisfies a predetermined criterion, and when the minimum value does not satisfy the predetermined criterion, the step F is carried out instead of the step E, the step F comprising preparing an annular mask with a modified inner peripheral contour according to the minimum value, such that the minimum value among $E_{MAX1}$, $E_{MAX2}$, $E_{MAX3}$, and $E_{MAX4}$ of a next cylindrical honeycomb dried body to be prepared can satisfy the criterion, and thereafter, the steps A to D are repeated again provided that the modified annular mask is used.

Further, in another embodiment of the present invention, the predetermined criterion can be that the minimum value among $E_{MAX1}$, $E_{MAX2}$, $E_{MAX3}$, and $E_{MAX4}$ is in the range of $-0.3$ mm to $-0.1$ mm.

In yet another embodiment of the present invention, in the step C, the following are calculated:

$$(D_{1MIN}+D_{4MIN}+D_{6MIN})-(D_{2MIN}+D_{5MIN}+D_{8MIN})=E_{MIN1},$$

$$(D_{3MIN}+D_{6MIN}+D_{8MIN})-(D_{2MIN}+D_{4MIN}+D_{7MIN})=E_{MIN2},$$

$$(D_{2MIN}+D_{5MIN}+D_{8MIN})-(D_{1MIN}+D_{4MIN}+D_{6MIN})=E_{MIN3}, \text{ and}$$

$$(D_{2MIN}+D_{4MIN}+D_{7MIN})-(D_{3MIN}+D_{6MIN}+D_{8MIN})=E_{MIN4},$$

in which, assuming that a location on the outer peripheral side surface located at the vertex during the extrusion molding in the step A is 0 rad, with a clockwise direction as a + direction, $D_{1MIN}$ is defined as a minimum value of distance between a center of gravity position O and an outer peripheral contour of the cross-section in a central angle (rad) from $-1/8\pi$ to $+1/8\pi$, $D_{2MIN}$ is defined as a minimum value of distance between the center of gravity position O and the outer peripheral contour of the cross-section in a central angle (rad) from $+1/8\pi$ to $+3/8\pi$, $D_{3MIN}$ is defined as a minimum value of distance between the center of gravity position O and the outer peripheral contour of the cross-section in a central angle (rad) from $+3/8\pi$ to $+5/8\pi$, $D_{4MIN}$ is defined as a minimum value of distance between the center of gravity position O and the outer peripheral contour of the cross-section in a central angle (rad) from $+5/8\pi$ to $+7/8\pi$, $D_{5MIN}$ is defined as a minimum value of distance between the center of gravity position O and the outer peripheral contour of the cross-section in a central angle (rad) from $+7/8\pi$ to $+9/8\pi$, $D_{6MIN}$ is defined as a minimum value of distance between the center of gravity position O and the outer peripheral contour of the cross-section in a central angle (rad) from $+9/8\pi$ to $+11/8\pi$, $D_{7MIN}$ is defined as a minimum value of distance between the center of gravity position O and the outer peripheral contour of the cross-section in a central angle (rad) from $+11/8\pi$ to $+13/8\pi$, and $D_{8MIN}$ is defined as a minimum value of distance between the center of gravity position O and the outer peripheral contour of the cross-section in a central angle (rad) from $+13/8\pi$ to $+15/8\pi$.

$E_{MIN1}$, $E_{MIN2}$, $E_{MIN3}$, and $E_{MIN4}$ can be calculated based on measurement results using a displacement gauge in a manner similar to $E_{AVE1}$, $E_{AVE2}$, $E_{AVE3}$, and $E_{AVE4}$.

Further, in yet another embodiment of the present invention, regarding $E_{MIN1}$, $E_{MIN2}$, $E_{MIN3}$, and $E_{MIN4}$, it is determined whether or not the minimum value among $E_{MIN1}$, $E_{MIN2}$, $E_{MIN3}$, and $E_{MIN4}$ specified in the step D satisfies a predetermined criterion, and the step E is performed only when the minimum value satisfies the predetermined criterion.

Further, in yet another embodiment of the present invention, it is determined whether or not the minimum value among $E_{MIN1}$, $E_{MIN2}$, $E_{MIN3}$, and $E_{MIN4}$ specified in the step D satisfies a predetermined criterion, and when the minimum value does not satisfy the predetermined criterion, the step F is carried out instead of the step E, the step F comprising preparing an annular mask with a modified inner peripheral contour according to the minimum value, such that the minimum value among $E_{MIN1}$, $E_{MIN2}$, $E_{MIN3}$, and $E_{MIN4}$ of a next cylindrical honeycomb dried body to be prepared can satisfy the criterion, and thereafter, the steps A to D are repeated again provided that the modified annular mask is used.

Further, in yet another embodiment of the present invention, the predetermined criterion can be that the minimum value among $E_{MIN1}$, $E_{MIN2}$, $E_{MIN3}$, and $E_{MIN4}$ is in the range of −0.3 mm to −0.1 mm.

A degreasing step may be performed before firing. The combustion temperature of the binder is about 200° C., and the combustion temperature of the pore-forming material is about 300 to 1000° C. Therefore, the degreasing step may be carried out by heating the honeycomb formed body to a temperature range of about 200 to 1000° C. The heating time is not particularly limited, but is usually about 10 to 100 hours. The cylindrical honeycomb dried body after the degreasing process is called a calcined body.

EXAMPLES

The following Examples and Comparative Examples relate to a method for manufacturing a cylindrical honeycomb fired body having the following design specifications.

Overall shape: cylindrical with a diameter of 158 mm and a height of 100 mm

Cell shape in the cross-section perpendicular to the flow path direction of the cells: square Cell density (number of cells per unit cross-sectional area): 600 cells/square inch Partition wall thickness: 69 μm Porosity: 27%

Test Examples 1 to 9

(1. Preparation of Cylindrical Honeycomb Fired Body)

To 100 parts by mass of a cordierite-forming raw material, 1 part by mass of a pore-forming material, 30 parts by mass of a dispersion medium, 8 parts by mass of an organic binder, and 1 part by mass of a dispersant were added, mixed and kneaded to prepare a green body. As the cordierite-forming raw material, alumina, aluminum hydroxide, kaolin, talc, and silica were used. Water was used as the dispersion medium, a water-absorbing resin was used as the pore-forming material, hydroxypropyl methylcellulose was used as the organic binder, and ethylene glycol was used as the dispersant.

The green body was put into an extrusion molding device and extrusion molded through a die defining a predetermined opening shape of cells, and an annular mask that was provided downstream of the die with an inner peripheral contour (diameter=175.0 mm perfect circle shape) for defining the outer peripheral contour of the first end surface and the second end surface to obtain a cylindrical honeycomb formed body. After dielectric drying and hot-gas drying the obtained cylindrical honeycomb formed bodies according to each Test Example, both end surfaces were cut to have predetermined dimensions to obtain cylindrical honeycomb dried bodies. At the time of dielectric drying and hot gas drying, they were placed in the drier such that the direction in which the cells extend was the vertical direction, and dried while being passed through the drier such that the location on the outer peripheral side surface located at the vertex during the extrusion molding was positioned at the front.

The cylindrical dried honeycomb body was placed on the rotary stage 710 of the shape measuring device 700 shown in FIG. 7 such that the rotation axis A and the center of gravity position O of the upper end surface of the cylindrical honeycomb dried body 750 were aligned, and according to the above-described procedure, the distance between an arbitrary point 753a on the outer peripheral side surface 753 and the displacement gauge 720 in the normal direction of the point 753a was continuously measured while rotating the rotary stage 710 for one revolution (average peripheral speed: 553 mm/sec). Based on the measurement results, assuming that the cross-section perpendicular to the direction in which the cells of the cylindrical honeycomb dried body extended was observed from the front side in the traveling direction of the extrusion molding of the step A, $D_{1AVE}$, $D_{2AVE}$, $D_{3AVE}$, $D_{4AVE}$, $D_{5AVE}$, $D_{6AVE}$, $D_{7AVE}$, and $D_{8AVE}$ were calculated, and the amount of sag ($E_{AVE1}$, $E_{AVE2}$, $E_{AVE3}$, and $E_{AVE4}$) were calculated. As the displacement gauge 720, a model ILD2300-100 laser displacement gauge manufactured by Micro-Epsilon was used. The height position of the outer peripheral side surface 753 irradiated with the laser 722 was the center of the cylindrical honeycomb dried body. Further, the above-mentioned roundness was obtained from the measurement results. The results are shown in Table 1. Although the manufacturing conditions for the cylindrical honeycomb formed body and the cylindrical honeycomb dried body according to each Test Example were not intentionally changed, as shown in Table 1, slight dimensional fluctuation occurred.

Among the four parameters $E_{AVE1}$, $E_{AVE2}$, $E_{AVE3}$, and $E_{AVE4}$, the minimum value and the parameter showing the minimum value were specified. The results are shown in Table 1.

Next, for Test Examples 1 to 6 and 9, the cylindrical honeycomb dried bodies were placed on a shelf plate such that the direction in which the cells of the cylindrical honeycomb dried body extend was parallel to the vertical direction and:
- when the minimum value was $E_{AVE1}$, a location on the outer peripheral side surface corresponding to 0 rad was positioned at the front,
- when the minimum value was $E_{AVE2}$, a location on the outer peripheral side surface corresponding to 4/8 π rad was positioned at the front,
- when the minimum value was $E_{AVE3}$, a location on the outer peripheral side surface corresponding to 8/8 π rad was positioned at the front, and
- when the minimum value was $E_{AVE4}$, a location on the outer peripheral side surface corresponding to 12/8 π rad was positioned at the front.

For Test Example 7, the cylindrical honeycomb dried body was placed on a shelf plate such that the direction in which the cells of the cylindrical honeycomb dried body extend was parallel to the vertical direction and a location on the outer peripheral side surface corresponding to 0 rad was positioned at the front.

For Test Example 8, the cylindrical honeycomb dried body was placed on a shelf plate such that the direction in which the cells of the cylindrical honeycomb dried body extend was parallel to the vertical direction and a location on the outer peripheral side surface corresponding to 8/8 π rad was positioned at the front.

After that, the shelf plate on which the dried cylindrical honeycomb bodies were placed was loaded on a cart and passed through a degreasing region and a firing region in a continuous firing furnace to perform firing under the following conditions to obtain the cylindrical honeycomb fired bodies.

[Firing Conditions]
Holding temperature in the firing region: 1430° C.
Holding time at holding temperature: 240 minutes
Furnace gas flow direction: headwind relative to the workpiece in the rising temperature region and the first half of the holding temperature region, which have the greatest effect on firing shrinkage,
Burner position: upper side and lower side in the furnace For the obtained cylindrical honeycomb fired bodies according to each Test Example, similar to the cylindrical honeycomb dried bodies, $D_{1AVE}$, $D_{2AVE}$, $D_{3AVE}$, $D_{4AVE}$, $D_{5AVE}$, $D_{6AVE}$, $D_{7AVE}$, and $D_{8AVE}$ were calculated using the shape measuring device 700. Then, among the four amounts of sag obtained from the dried body, the amount of sag after firing regarding the parameter showing the minimum value was calculated. The results are shown in Table 1. In addition, the roundness of the cylindrical honeycomb fired body was also obtained in the same manner. As described above, if the cylindrical honeycomb dried body was fired in a random orientation, the roundness of the fired body deteriorates by about 0.2 mm on average compared to the dried body. Therefore, if the deterioration of the roundness is less than 0.2 mm, it is judged that significant improvement is observed. Therefore, when the deterioration of the roundness was less than 0.2 mm, it was evaluated as "OK", and when it was 0.2 mm or more, it was evaluated as "NG". The results are shown in Table 1.

TABLE 1

| | Cylindrical honeycomb dried body | | | Firing condition Location of outer peripheral side surface at front position during firing | Cylindrical honeycomb fired body | | Evaluation | | |
|---|---|---|---|---|---|---|---|---|---|
| Test number | Roundness (mm) | Minimum value among 4 amounts of sag | Pamater showing minimum value among 4 amounts of sag | | Roundness (mm) | Amount of sag after firing regarding parameter showing minimum value among 4 amounts of sag obtained for dried body | Change in amount of sag before and after firing regarding parameter showing minimum valve among 4 amounts of sag (after firing) − (before firing) | Change in roundness (mm) | Judgment |
| Test Example 1 | 0.589 | −0.151 | EAVE1 | 0 rad | 0.574 | 0.046 | 0.197 | −0.025 | OK |
| Test Example 2 | 0.528 | −0.895 | EAVE1 | 0 rad | 0.656 | 0.062 | 0.157 | 0.128 | OK |
| Test Example 3 | 1.025 | −0.321 | EAVE3 | 8/8π rad | 0.922 | −0.104 | 0.217 | −0.103 | OK |
| Test Example 4 | 0.801 | −0.263 | EAVE3 | 8/8π rad | 0.73 | −0.11 | 0.153 | −0.071 | OK |
| Test Example 5 | 0.759 | −0.081 | EAVE1 | 0 rad | 0.78 | 0.102 | 0.183 | 0.021 | OK |
| Test Example 6 | 0.95 | −0.14 | EAVE2 | 4/8π rad | 1.06 | 0.103 | 0.243 | 0.11 | OK |
| Test Example 7 | 0.802 | 0.088 | EAVE4 | 0 rad | 1.032 | 0.432 | 0.366 | 0.23 | NG |
| Test Example 8 | 0.815 | 0.232 | EAVE4 | 8/8π rad | 1.184 | 0.505 | 0.273 | 0.369 | NG |
| Test Example 9 | 0.859 | −0.284 | EAVE4 | 12/8π rad | 0.761 | −0.117 | 0.167 | −0.098 | OK |

DISCUSSION

For Test Examples 1 to 6 and 9, it can be understood that, by optimizing the orientation of the cylindrical honeycomb dried body when firing the cylindrical honeycomb dried body, the deterioration of the roundness of the obtained cylindrical honeycomb fired body during firing was suppressed as compared with Test Examples 7 and 8. In addition, the change in the amount of sag before and after firing regarding the parameter showing the minimum value among the four amounts of sag obtained from the cylindrical honeycomb dried bodies was about +0.2 mm. Therefore, based on this result, by setting the acceptance criterion for the minimum value in the cylindrical honeycomb dried body, it is possible to determine whether the firing process should be proceeded, or the inner peripheral contour of the annular mask should be modified to prepare a formed body again.

DESCRIPTION OF REFERENCE NUMERALS

100: Cylindrical honeycomb fired body
102: Outer peripheral side surface
103: Outer peripheral side wall
104: First end surface
106: Second end surface
108: Cell
112: Partition wall
200: Cylindrical honeycomb fired body
202: Outer peripheral side surface
203: Outer peripheral side wall
204: First end surface
206: Second end surface
208a: First cell
208b: Second cell
209: Sealing portion
212: Partition wall
500: Extrusion molding device
510: Die
511: Inner portion
511a: Slit
512: Outer peripheral portion
512a: Slit
513: Step portion
520: Annular mask
522: Inner peripheral contour
530: Gap portion
540: Holding jig
550: Back holding plate
560: Cylindrical honeycomb formed body
700: Shape measuring device
710: Rotary stage
720: Displacement gauge
722: Laser
740: Computer
750: Cylindrical honeycomb dried body
753: Outer peripheral side surface
753a: Point on outer peripheral side surface
770: Z stage

The invention claimed is:

1. A method for manufacturing a cylindrical honeycomb fired body, the cylindrical honeycomb fired body comprising an outer peripheral side surface, and partition walls disposed on an inner peripheral side of the outer peripheral side surface and partitioning a plurality of cells forming flow paths from a first end surface to a second end surface, the method comprising:

a step A of preparing a cylindrical honeycomb formed body by extrusion molding a green body comprising a ceramic raw material, a pore-forming material, a binder and a dispersion medium through a die defining an opening shape of the plurality of cells and an annular mask located downstream of the die and having an inner peripheral contour for defining an outer peripheral contour of the first end surface and the second end surface, such that a direction in which the cells extend is horizontal and a front side in a traveling direction of the extrusion molding is the first end surface, and a rear side is the second end surface, and then by cutting to a predetermined length;

a step B of obtaining a cylindrical honeycomb dried body by drying the cylindrical honeycomb formed body;

a step C of calculating:

$$(D_{1AVE}+D_{4AVE}+D_{6AVE})-(D_{2AVE}+D_{5AVE}+D_{8AVE})=E_{AVE1},$$

$$(D_{3AVE}+D_{6AVE}+D_{8AVE})-(D_{2AVE}+D_{4AVE}+D_{7AVE})=E_{AVE2},$$

$$(D_{2AVE}+D_{5AVE}+D_{8AVE})-(D_{1AVE}+D_{4AVE}+D_{6AVE})=E_{AVE3}, \text{ and}$$

$$(D_{2AVE}+D_{4AVE}+D_{7AVE})-(D_{3AVE}+D_{6AVE}+D_{8AVE})=E_{AVE4},$$

in which, assuming that a cross-section perpendicular to the direction in which the cells of the cylindrical honeycomb dried body extend is observed from the front side in the traveling direction of the extrusion molding of the step A, and a location on the outer peripheral side surface located at a vertex during the extrusion molding in the step A is 0 rad, with a clockwise direction as a + direction, $D_{1AVE}$ is defined as an average value of distance between a center of gravity position O and an outer peripheral contour of the cross-section in a central angle (rad) from $-\frac{1}{8}\pi$ to $+\frac{1}{8}\pi$, $D_{2AVE}$ is defined as an average value of distance between the center of gravity position O and the outer peripheral contour of the cross-section in a central angle (rad) from $+\frac{1}{8}\pi$ to $+\frac{3}{8}\pi$, $D_{3AVE}$ is defined as an average value of distance between the center of gravity position O and the outer peripheral contour of the cross-section in a central angle (rad) from $+\frac{3}{8}\pi$ to $+\frac{5}{8}\pi$, $D_{4AVE}$ is defined as an average value of distance between the center of gravity position O and the outer peripheral contour of the cross-section in a central angle (rad) from $+\frac{5}{8}\pi$ to $+\frac{7}{8}\pi$, $D_{5AVE}$ is defined as an average value of distance between the center of gravity position O and the outer peripheral contour of the cross-section in a central angle (rad) from $+\frac{7}{8}\pi$ to $+9/8\pi$, $D_{6AVE}$ is defined as an average value of distance between the center of gravity position O and the outer peripheral contour of the cross-section in a central angle (rad) from $+9/8\pi$ to $+11/8\pi$, $D_{7AVE}$ is defined as an average value of distance between the center of gravity position O and the outer peripheral contour of the cross-section in a central angle (rad) from $+11/8\pi$ to $+13/8\pi$, and $D_{8AVE}$ is defined as an average value of distance between the center of gravity position O and the outer peripheral contour of the cross-section in a central angle (rad) from $+13/8\pi$ to $+15/8\pi$;

a step D of specifying a minimum value among $E_{AVE1}$, $E_{AVE2}$, $E_{AVE3}$, and $E_{AVE4}$ calculated in the step C;

a step E of obtaining the cylindrical honeycomb fired body by placing the cylindrical honeycomb dried body on a shelf plate and firing the cylindrical honeycomb dried body while passing it through a continuous firing furnace, such that the direction in which the cells of the cylindrical honeycomb dried body extend is parallel to a vertical direction and:
- when the minimum value is $E_{AVE1}$, a location on the outer peripheral side surface corresponding to 0 rad is positioned at the front side in the traveling direction of the extrusion molding,
- when the minimum value is $E_{AVE2}$, a location on the outer peripheral side surface corresponding to 4/8 π rad is positioned at the front side in the traveling direction of the extrusion molding,
- when the minimum value is $E_{AVE3}$, a location on the outer peripheral side surface corresponding to 8/8 π rad is positioned at the front side in the traveling direction of the extrusion molding, and
- when the minimum value is $E_{AVE4}$, a location on the outer peripheral side surface corresponding to 12/8 π rad is positioned at the front side in the traveling direction of the extrusion molding.

2. The method for manufacturing the cylindrical honeycomb fired body according to claim 1, wherein the step B comprises placing the honeycomb formed body in a dryer such that the direction in which the cells extend is the vertical direction, and drying the honeycomb formed body while passing it through the dryer such that the location on the outer peripheral side surface located at the vertex during the extrusion molding in the step A is positioned at the front side in the traveling direction of the extrusion molding.

3. The method for manufacturing the cylindrical honeycomb fired body according to claim 1, comprising determining whether or not the minimum value specified in the step D satisfies a predetermined criterion, and performing the step E only when the minimum value satisfies the predetermined criterion.

4. The method for manufacturing the cylindrical honeycomb fired body according to claim 3, comprising determining whether or not the minimum value specified in the step D satisfies the predetermined criterion, and when the minimum value does not satisfy the predetermined criterion, performing a step F instead of the step E, the step F comprising preparing an annular mask with a modified inner peripheral contour according to the minimum value, such that a minimum value among $E_{AVE1}$, $E_{AVE2}$, $E_{AVE3}$, and $E_{AVE4}$ of a next cylindrical honeycomb dried body to be prepared can satisfy the criterion; and the method further comprising thereafter repeating the steps A to D again provided that the modified annular mask is used.

5. The method for manufacturing the cylindrical honeycomb fired body according to claim 3, wherein the predetermined criterion is that the minimum value is in the range of −0.3 mm to −0.1 mm.

6. The method for manufacturing the cylindrical honeycomb fired body according to claim 1, wherein for calculating $E_{AVE1}$, $E_{AVE2}$, $E_{AVE3}$, and $E_{AVE4}$, the step C comprises in sequence:
- placing the cylindrical honeycomb dried body on a rotary stage with the first end surface or the second end surface facing upward; and
- continuously measuring distance using a displacement gauge between an arbitrary point on the outer peripheral side surface of the cylindrical honeycomb dried body and the displacement gauge while rotating the rotary stage for one revolution.

7. A method for manufacturing a cylindrical honeycomb fired body, the cylindrical honeycomb fired body comprising an outer peripheral side surface, and partition walls disposed on an inner peripheral side of the outer peripheral side surface and partitioning a plurality of cells forming flow paths from a first end surface to a second end surface, the method comprising:
- a step A of preparing a cylindrical honeycomb formed body by extrusion molding a green body comprising a ceramic raw material, a pore-forming material, a binder and a dispersion medium through a die defining an opening shape of the plurality of cells and an annular mask located downstream of the die and having an inner peripheral contour for defining an outer peripheral contour of the first end surface and the second end surface, such that a direction in which the cells extend is horizontal and a front side in a traveling direction of the extrusion molding is the first end surface, and a rear side is the second end surface, and then by cutting to a predetermined length;
- a step B of obtaining a cylindrical honeycomb dried body by drying the cylindrical honeycomb formed body;
- a step C of calculating:

$$(D_{1MAX}+D_{4MAX}+D_{6MAX})-(D_{2MAX}+D_{5MAX}+D_{8MAX})=E_{MAX1},$$

$$(D_{3MAX}+D_{6MAX}+D_{8MAX})-(D_{2MAX}+D_{4MAX}+D_{7MAX})=E_{MAX2},$$

$$(D_{2MAX}+D_{5MAX}+D_{8MAX})-(D_{1MAX}+D_{4MAX}+D_{6MAX})=E_{MAX3}, \text{ and}$$

$$(D_{2MAX}+D_{4MAX}+D_{7MAX})-(D_{3MAX}+D_{6MAX}+D_{8MAX})=E_{MAX4},$$

in which, assuming that a cross-section perpendicular to the direction in which the cells of the cylindrical honeycomb dried body extend is observed from the front side in the traveling direction of the extrusion molding of the step A, and a location on the outer peripheral side surface located at a vertex during the extrusion molding in the step A is 0 rad, with a clockwise direction as a + direction, $D_{1MAX}$ is defined as a maximum value of distance between a center of gravity position O and an outer peripheral contour of the cross-section in a central angle (rad) from −1/8π to +1/8π, $D_{2MAX}$ is defined as a maximum value of distance between the center of gravity position O and the outer peripheral contour of the cross-section in a central angle (rad) from +1/8π to +3/8π, $D_{3MAX}$ is defined as a maximum value of distance between the center of gravity position O and the outer peripheral contour of the cross-section in a central angle (rad) from +3/8π to +5/8π, $D_{4MAX}$ is defined as a maximum value of distance between the center of gravity position O and the outer peripheral contour of the cross-section in a central angle (rad) from +5/8π to +7/8π, $D_{5MAX}$ is defined as a maximum value of distance between the center of gravity position O and the outer peripheral contour of the cross-section in a central angle (rad) from +7/8π to +9/8π, $D_{6MAX}$ is defined as a maximum value of distance between the center of gravity position O and the outer peripheral contour of the cross-section in a central angle (rad) from +9/8π to +11/8π, $D_{7MAX}$ is defined as a maximum value of distance between the center of gravity position O and the outer peripheral contour of the cross-section in a central angle (rad) from +11/8π to +13/8π, and $D_{8MAX}$ is defined as a maximum value of distance between the center of gravity position O and the outer peripheral contour of the cross-section in a central angle (rad) from +13/8π to +15/8π;

a step D of specifying a minimum value among $E_{MAX1}$, $E_{MAX2}$, $E_{MAX3}$, and $E_{MAX4}$ calculated in the step C;

a step E of obtaining the cylindrical honeycomb fired body by placing the cylindrical honeycomb dried body on a shelf plate and firing the cylindrical honeycomb dried body while passing it through a continuous firing furnace, such that the direction in which the cells of the cylindrical honeycomb dried body extend is parallel to a vertical direction and:

when the minimum value is $E_{MAX1}$, a location on the outer peripheral side surface corresponding to 0 rad is positioned at the front side in the traveling direction of the extrusion molding, when the minimum value is $E_{MAX2}$, a location on the outer peripheral side surface corresponding to 4/8 π rad is positioned at the front side in the traveling direction of the extrusion molding, when the minimum value is $E_{MAX3}$, a location on the outer peripheral side surface corresponding to 8/8 π rad is positioned at the front side in the traveling direction of the extrusion molding, and when the minimum value is $E_{MAX4}$, a location on the outer peripheral side surface corresponding to 12/8 π rad is positioned at the front side in the traveling direction of the extrusion molding.

8. The method for manufacturing the cylindrical honeycomb fired body according to claim 7, wherein the step B comprises placing the honeycomb formed body in a dryer such that the direction in which the cells extend is the vertical direction, and drying the honeycomb formed body while passing it through the dryer such that the location on the outer peripheral side surface located at the vertex during the extrusion molding in the step A is positioned at the front side in the traveling direction of the extrusion molding.

9. The method for manufacturing the cylindrical honeycomb fired body according to claim 7, comprising determining whether or not the minimum value specified in the step D satisfies a predetermined criterion, and performing the step E only when the minimum value satisfies the predetermined criterion.

10. The method for manufacturing the cylindrical honeycomb fired body according to claim 9, comprising determining whether or not the minimum value specified in the step D satisfies the predetermined criterion, and when the minimum value specified in the step D does not satisfy the predetermined criterion, performing a step F instead of the step E, the step F comprising preparing an annular mask with a modified inner peripheral contour according to the minimum value, such that a minimum value among $E_{MAX1}$, $E_{MAX2}$, $E_{MAX3}$, and $E_{MAX4}$ of a next cylindrical honeycomb dried body to be prepared can satisfy the criterion; and the method further comprising thereafter repeating the steps A to D again provided that the modified annular mask is used.

11. The method for manufacturing the cylindrical honeycomb fired body according to claim 9, wherein the predetermined criterion is that the minimum value specified in step D is in a range of −0.3 mm to −0.1 mm.

12. The method for manufacturing the cylindrical honeycomb fired body according to claim 7, wherein for calculating $E_{MAX1}$, $E_{MAX2}$, $E_{MAX3}$, and $E_{MAX4}$, the step C comprises in sequence:

placing the cylindrical honeycomb dried body on a rotary stage with the first end surface or the second end surface facing upward; and continuously measuring distance using a displacement gauge between an arbitrary point on the outer peripheral side surface of the cylindrical honeycomb dried body and the displacement gauge while rotating the rotary stage for one revolution.

13. A method for manufacturing a cylindrical honeycomb fired body, the cylindrical honeycomb fired body comprising an outer peripheral side surface, and partition walls disposed on an inner peripheral side of the outer peripheral side surface and partitioning a plurality of cells forming flow paths from a first end surface to a second end surface, the method comprising:

a step A of preparing a cylindrical honeycomb formed body by extrusion molding a green body comprising a ceramic raw material, a pore-forming material, a binder and a dispersion medium through a die defining an opening shape of the plurality of cells and an annular mask located downstream of the die and having an inner peripheral contour for defining an outer peripheral contour of the first end surface and the second end surface, such that a direction in which the cells extend is horizontal and a front side in a traveling direction of the extrusion molding is the first end surface, and a rear side is the second end surface, and then by cutting to a predetermined length;

a step B of obtaining a cylindrical honeycomb dried body by drying the cylindrical honeycomb formed body;

a step C of calculating:

$$(D_{1MIN}+D_{4MIN}+D_{6MIN})-(D_{2MIN}+D_{5MIN}+D_{8MIN})=E_{MIN1},$$

$$(D_{3MIN}+D_{6MIN}+D_{8MIN})-(D_{2MIN}+D_{4MIN}+D_{7MIN})=E_{MIN2},$$

$$(D_{2MIN}+D_{5MIN}+D_{8MIN})-(D_{1MIN}+D_{4MIN}+D_{6MIN})=E_{MIN3}, \text{ and}$$

$$(D_{2MIN}+D_{4MIN}+D_{7MIN})-(D_{3MIN}+D_{6MIN}+D_{8MIN})=E_{MIN4},$$

in which, assuming that a cross-section perpendicular to the direction in which the cells of the cylindrical honeycomb dried body extend is observed from the front side in the traveling direction of the extrusion molding of the step A, and a location on the outer peripheral side surface located at a vertex during the extrusion molding in the step A is 0 rad, with a clockwise direction as a + direction, $D_{1MIN}$ is defined as a minimum value of distance between a center of gravity position O and an outer peripheral contour of the cross-section in a central angle (rad) from −1/8π to +1/8π, $D_{2MIN}$ is defined as a minimum value of distance between the center of gravity position O and the outer peripheral contour of the cross-section in a central angle (rad) from +1/8π to +3/8π, $D_{3MIN}$ is defined as a minimum value of distance between the center of gravity position O and the outer peripheral contour of the cross-section in a central angle (rad) from +3/8π to +5/8π, $D_{4MIN}$ is defined as a minimum value of distance between the center of gravity position O and the outer peripheral contour of the cross-section in a central angle (rad) from +5/8π to +7/8π, $D_{5MIN}$ is defined as a minimum value of distance between the center of gravity position O and the outer peripheral contour of the cross-section in a central angle (rad) from +7/8π to +9/8π, $D_{6MIN}$ is defined as a minimum value of distance between the center of gravity position O and the outer peripheral contour of the cross-section in a central angle (rad) from +9/8π to +11/8π, $D_{7MIN}$ is defined as a minimum value of distance between the center of gravity position O and the outer peripheral contour of the cross-section in a central angle (rad) from +11/8π to +13/8π, and $D_{8MIN}$ is defined as a minimum value of distance between the center of gravity position O and the outer peripheral contour of the cross-section in a central angle (rad) from +13/8π to +15/8π;

a step D of specifying a minimum value among $E_{MIN1}$, $E_{MIN2}$, $E_{MIN3}$, and $E_{MIN4}$ calculated in the step C;

a step E of obtaining the cylindrical honeycomb fired body by placing the cylindrical honeycomb dried body on a shelf plate and firing the cylindrical honeycomb dried body while passing it through a continuous firing furnace, such that the direction in which the cells of the cylindrical honeycomb dried body extend is parallel to a vertical direction and:

when the minimum value is $E_{MIN1}$, a location on the outer peripheral side surface corresponding to 0 rad is positioned at the front side in the traveling direction of the extrusion molding, when the minimum value is $E_{MIN2}$, a location on the outer peripheral side surface corresponding to 4/8 π rad is positioned at the front side in the traveling direction of the extrusion molding, when the minimum value is $E_{MIN3}$, a location on the outer peripheral side surface corresponding to 8/8 π rad is positioned at the front side in the traveling direction of the extrusion molding, and when the minimum value is $E_{MIN4}$, a location on the outer peripheral side surface corresponding to 12/8 π rad is positioned at the front side in the traveling direction of the extrusion molding.

14. The method for manufacturing the cylindrical honeycomb fired body according to claim 13, wherein the step B comprises placing the honeycomb formed body in a dryer such that the direction in which the cells extend is the vertical direction, and drying the honeycomb formed body while passing it through the dryer such that the location on the outer peripheral side surface located at the vertex during the extrusion molding in the step A is positioned at the front side in the traveling direction of the extrusion molding.

15. The method for manufacturing the cylindrical honeycomb fired body according to claim 13, comprising determining whether or not the minimum value specified in the step D satisfies a predetermined criterion, and performing the step E only when the minimum value specified in the step D satisfies the predetermined criterion.

16. The method for manufacturing the cylindrical honeycomb fired body according to claim 15, comprising determining whether or not the minimum value specified in the step D satisfies the predetermined criterion, and when the minimum value specified in the step D does not satisfy the predetermined criterion, performing a step F instead of the step E, the step F comprising preparing an annular mask with a modified inner peripheral contour according to the minimum value, such that a minimum value among $E_{MIN1}$, $E_{MIN2}$, $E_{MIN3}$, and $E_{MIN4}$ of a next cylindrical honeycomb dried body to be prepared can satisfy the criterion; and the method further comprising thereafter repeating the steps A to D again provided that the modified annular mask is used.

17. The method for manufacturing the cylindrical honeycomb fired body according to claim 15, wherein the predetermined criterion is that the minimum value specified in the step D is in a range of −0.3 mm to −0.1 mm.

18. The method for manufacturing the cylindrical honeycomb fired body according to claim 13, wherein for calculating $E_{MIN1}$, $E_{MIN2}$, $E_{MIN3}$, and $E_{MIN4}$, the step C comprises in sequence:

placing the cylindrical honeycomb dried body on a rotary stage with the first end surface or the second end surface facing upward; and continuously measuring distance using a displacement gauge between an arbitrary point on the outer peripheral side surface of the cylindrical honeycomb dried body and the displacement gauge while rotating the rotary stage for one revolution.

* * * * *